United States Patent
Maeda et al.

(10) Patent No.: US 8,655,563 B2
(45) Date of Patent: Feb. 18, 2014

(54) BRAKING/DRIVING FORCE CONTROLLER OF VEHICLE

(75) Inventors: Yoshinori Maeda, Aichi-gun (JP);
Kazuya Okumura, Suntou-gun (JP);
Michitaka Tsuchida, Susono (JP);
Yoshio Uragami, Mishima (JP);
Kensuke Yoshizue, Susono (JP); Satoshi Ando, Fuji (JP); Koji Sugiyama, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1362 days.

(21) Appl. No.: 11/815,367

(22) PCT Filed: Feb. 2, 2006

(86) PCT No.: PCT/JP2006/302207
§ 371 (c)(1),
(2), (4) Date: Mar. 20, 2008

(87) PCT Pub. No.: WO2006/083008
PCT Pub. Date: Aug. 10, 2006

(65) Prior Publication Data
US 2008/0221766 A1     Sep. 11, 2008

(30) Foreign Application Priority Data
Feb. 2, 2005   (JP) .................................. 2005-026758

(51) Int. Cl.
*G05D 1/08*    (2006.01)
(52) U.S. Cl.
USPC ............. 701/70; 701/29.1; 701/32.7; 701/36; 701/71; 701/78; 701/79; 701/81; 701/82; 701/83; 701/84; 180/282

(58) Field of Classification Search
USPC ............................. 701/1, 22, 36–45, 69–109; 303/146–150, 152, 162; 180/197; 477/35; 361/238
See application file for complete search history.

(56) References Cited

U.S. PATENT DOCUMENTS 5,702,165 A * 12/1997 Koibuchi ...................... 303/146
5,722,743 A *  3/1998 Sano ............................. 303/146

(Continued)

FOREIGN PATENT DOCUMENTS

EP    1 207 090 A2    5/2002
EP    1 207 090 A3    5/2002

(Continued)

OTHER PUBLICATIONS

U.S. Appl. No. 11/916,073, filed Nov. 30, 2007, Uragami, et al.

(Continued)

*Primary Examiner* — Jonathan M Dager
(74) *Attorney, Agent, or Firm* — Oblon, Spivak, McClelland, Maier & Neustadt, L.L.P.

(57) ABSTRACT

In a braking/driving force control apparatus, a vehicle target braking/driving force and a vehicle target yaw moment through the control of braking/driving forces of wheels are calculated, and when the target braking/driving force and the target yaw moment cannot be achieved through the control of the braking/driving forces of the wheels, the vehicle target braking/driving force after the modification and the vehicle target yaw moment after the modification are calculated such that, within the range where the ratio of the vehicle target braking/driving force after the modification and the vehicle target yaw moment after the modification coincides with the ratio of the target braking/driving force and the target yaw moment, the vehicle braking/driving force and the vehicle yaw moment by the target braking/driving forces of the wheels take the greatest values.

12 Claims, 9 Drawing Sheets

(56) References Cited

U.S. PATENT DOCUMENTS

| | | | | |
|---|---|---|---|---|
| 5,762,157 | A * | 6/1998 | Uehara | 180/197 |
| 5,971,089 | A * | 10/1999 | Sawada | 180/197 |
| 6,081,761 | A * | 6/2000 | Harada et al. | 701/72 |
| 6,089,680 | A * | 7/2000 | Yoshioka et al. | 303/146 |
| 6,292,734 | B1 * | 9/2001 | Murakami et al. | 701/84 |
| 6,473,682 | B1 * | 10/2002 | Nakamura | 701/74 |
| 6,659,570 | B2 * | 12/2003 | Nakamura | 303/146 |
| 7,386,379 | B2 * | 6/2008 | Naik et al. | 701/41 |
| 7,451,032 | B2 * | 11/2008 | Brown et al. | 701/70 |
| 7,974,761 | B2 * | 7/2011 | Maeda et al. | 701/70 |
| 8,301,353 | B2 * | 10/2012 | Ono et al. | 701/90 |
| 8,521,349 | B2 * | 8/2013 | Yu et al. | 701/22 |
| 2001/0005101 | A1 * | 6/2001 | Matsuno | 303/146 |
| 2001/0056317 | A1 * | 12/2001 | Nishizaki et al. | 701/48 |
| 2002/0036429 | A1 * | 3/2002 | Shimada et al. | 303/152 |
| 2002/0147532 | A1 * | 10/2002 | Inagaki et al. | 701/41 |
| 2002/0153770 | A1 * | 10/2002 | Matsuno et al. | 303/146 |
| 2003/0149515 | A1 * | 8/2003 | Hessmert et al. | 701/29 |
| 2004/0186647 | A1 * | 9/2004 | Ono | 701/70 |
| 2005/0107939 | A1 * | 5/2005 | Sadano et al. | 701/70 |
| 2005/0125131 | A1 * | 6/2005 | Kato et al. | 701/70 |

FOREIGN PATENT DOCUMENTS

| | | |
|---|---|---|
| EP | 1 486 391 A1 | 12/2004 |
| JP | 8 310366 | 11/1996 |
| JP | 9 86378 | 3/1997 |
| JP | 9 309357 | 12/1997 |
| JP | 2000 168525 | 6/2000 |
| JP | 2000 190832 | 7/2000 |
| JP | 2002 211378 | 7/2002 |
| JP | 2004 25996 | 1/2004 |
| JP | 2005 255107 | 9/2005 |
| RU | 2 108 247 C1 | 4/1998 |
| RU | 2212348 C2 | 9/2003 |

OTHER PUBLICATIONS

International Search Report issued Aug. 3, 2010 in EP Application No. 06713350.4-2423.

U.S. Appl. No. 12/097,629, filed Jun. 16, 2008, Meada, et al.

Office Action mailed Nov. 7, 2011, in co-pending U.S. Appl. No. 12/097,629.

Office Action issed Aug. 7, 2013 in co-pending U.S. Appl. No. 12/097,629, filed Jun. 16, 2008.

* cited by examiner

BRAKING/DRIVING FORCE CONTROLLER OF VEHICLE

TECHNICAL FIELD

The present invention relates to a vehicle braking/driving force control apparatus, and more particularly to a vehicle braking/driving force control apparatus that controls braking/driving force of each wheel.

BACKGROUND ART

As one of braking/driving force control apparatuses for a vehicle, such as an automobile, there has conventionally been known a driving force control apparatus, as disclosed in Japanese Unexamined Patent Application No. HE19-309357 for example, for performing a distribution control of driving force applied to left and right wheels so as to exert a required yaw moment to a vehicle. Further, there has already been known a braking force control apparatus that controls a vehicle braking/driving force and yaw moment by controlling braking forces of wheels so as to secure a vehicle running stability. This braking/driving force control apparatus can enhance running stability of a vehicle.

In general, the vehicle braking/driving force and yaw moment can be controlled through the control of the braking/driving forces of the wheels. However, there is a limitation in the braking/driving force that can be generated by each wheel. Therefore, there may be the case in which the braking/driving force and/or yaw moment required to the vehicle exceeds the value attainable by the control of the braking/driving forces of the wheels. This situation is not considered in the above-mentioned conventional braking/driving force control apparatus, and it is necessary to make an improvement on this point.

DISCLOSURE OF THE INVENTION

The present invention had been accomplished in view of the circumstance described above in the conventional vehicle braking/driving force control apparatus that is configured to control braking/driving force and yaw moment of the vehicle through the control of the braking/driving forces of the wheels, and the main subject of the present invention is to achieve a braking/driving force and yaw moment, which are required to the vehicle, as much as possible within the ranges of the braking/driving forces that can be generated by the wheels through the control of the braking/driving forces of the wheels such that the ratio of the vehicle braking/driving force and the yaw moment becomes the ratio of the braking/driving force and the yaw moment, required to the vehicle, within the range of the braking/driving forces that can be generated by the wheels.

The above-mentioned main subject can be achieved by a vehicle braking/driving force control apparatus comprising braking/driving force applying means that can apply braking/driving forces to wheels; means for detecting an amount of driving operation by an occupant; means for calculating a vehicle target braking/driving force and a vehicle target yaw moment, which should be generated by the braking/driving forces of the wheels, on the basis of at least the amount of the driving operation by the occupant; and control means for controlling the braking/driving force applied to each wheel by the braking/driving force applying means such that, when the target braking/driving force and/or the target yaw moment cannot be achieved by the braking/driving forces of the wheels, the vehicle braking/driving force and the yaw moment by the target braking/driving forces of the wheels take the greatest values within the range where the ratio of the vehicle target braking/driving force and the yaw moment by the braking/driving forces of the wheels substantially coincides with the ratio of the target braking/driving force and the target yaw moment by the braking/driving forces of the wheels.

With this configuration, when the target braking/driving force and/or the target yaw moment cannot be achieved by the braking/driving forces of the wheels, the braking/driving force applied to each wheel by the braking/driving force applying means is controlled such that the vehicle braking/driving force and the yaw moment by the target braking/driving forces of the wheels take the greatest values within the range where the ratio of the vehicle braking/driving force and the yaw moment by the braking/driving forces of the wheels substantially coincides with the ratio of the target braking/driving force and the target yaw moment, whereby the braking/driving force of each wheel is controlled such that the ratio of the vehicle braking/driving force and the yaw moment substantially coincides with the ratio of the target braking/driving force and the target yaw moment. Therefore, the braking/driving force and the yaw moment required to the vehicle can be achieved as much as possible within the range of the braking/driving forces that can be generated by the wheels.

According to one aspect of the present invention, in the aforesaid configuration, the control means preferably controls the braking/driving force applied to each wheel by the braking/driving force applying means such that, as a point of intersection of a segment, which links the point that shows the vehicle target braking/driving force and the vehicle target yaw moment and the origin, and a line indicating the greatest values of the vehicle braking/driving force and the yaw moment by the braking/driving forces of the wheels is defined as a target point in a rectangular coordinate with the vehicle driving/braking force and the vehicle yaw moment as coordinate axes, the vehicle braking/driving force and the yaw moment by the braking/driving forces of the wheels take the values at the target point.

With this configuration, the braking/driving force applied to each wheel by the braking/driving force applying means is controlled such that, as a point of intersection of a segment, which links the point that shows the vehicle target braking/driving force and the vehicle target yaw moment and the origin, and a line indicating the greatest values of the vehicle braking/driving force and the yaw moment by the braking/driving forces of the wheels is defined as the target point in a rectangular coordinate with the vehicle driving/braking force and the vehicle yaw moment as coordinate axes, the vehicle braking/driving force of each wheel and the yaw moment by the braking/driving forces of the wheels take the values at the target point. Therefore, the ratio of the vehicle braking/driving force and the yaw moment surely coincides with the ratio of the target braking/driving force and the target yaw moment and the vehicle braking/driving force and yaw moment by the braking/driving forces of the wheels take the greatest values, with the result that the vehicle braking/driving force and the yaw moment required to the vehicle can be achieved as much as possible within the range of the braking/driving forces that can be generated by the wheels.

According to another aspect of the present invention, in the above-mentioned configuration, it is preferable that the braking/driving force applying means independently applies braking/driving force to each wheel.

With this configuration, the braking/driving force applying means independently applies braking/driving force to each wheel, whereby the vehicle braking/driving force and the yaw moment required to the vehicle can be achieved as much as possible within the range of the braking/driving force that can be generated by the wheels through the independent control of the braking/driving forces of the wheels.

According to another aspect of the present invention, in the above-mentioned configuration, it is preferable that the braking/driving force applying means applies independently the braking force to each wheel, and applies a driving force from driving means, which is common to right and left wheels, to the right and left wheels in such a manner that the distribution of the driving forces to the right and left wheels is variable.

With this configuration, the braking/driving force applying means applies independently the braking/driving force to each wheel, and applies a driving force from driving means, which is common to right and left wheels, to the right and left wheels in such a manner that the distribution of the driving forces to the right and left wheels is variable. Therefore, the vehicle braking/driving force and the yaw moment required to the vehicle can be achieved as much as possible within the range of the braking/driving force that can be generated by the wheels through the independent control of the braking forces of the wheels and the distribution control of the driving forces of right and left wheels.

According to another aspect of the present invention, in the above-mentioned configuration, it is preferable that the means for calculating a vehicle target braking/driving force and a vehicle target yaw moment calculates the vehicle target braking/driving force and the vehicle target total yaw moment for causing the vehicle to stably run on the basis of at least the amount of the driving operation by an occupant, estimates a vehicle turning yaw moment due to a lateral force of each wheel on the basis of at least the amount of the driving operation by the occupant, and calculates the value obtained by subtracting the turning yaw moment from the target total yaw moment as the vehicle target yaw moment.

With this configuration, the vehicle target braking/driving force and the vehicle target total yaw moment for causing the vehicle to stably run is calculated on the basis of at least the amount of the driving operation by the occupant, a vehicle turning yaw moment due to a lateral force of each wheel is estimated on the basis of at least the amount of the driving operation by the occupant, and the value obtained by subtracting the turning yaw moment from the target total yaw moment is calculated as the vehicle target yaw moment, whereby the vehicle target yaw moment required to the vehicle to be attained by the control of the braking/driving force of each wheel can be surely and correctly calculated in just proportion.

According to another aspect of the present invention, in the above-mentioned configurations, it is preferable that the means for detecting an amount of driving operation by an occupant detects an amount of acceleration/deceleration operation and an amount of steering operation by an occupant.

According to another aspect of the present invention, in the above-mentioned configurations, it is preferable that the line indicating the greatest values in magnitudes of the vehicle braking/driving force and the vehicle yaw moment is determined by the greatest value of the vehicle driving force, the greatest value of the vehicle braking force, the greatest value of the vehicle yaw moment in the leftward turning direction and the vehicle yaw moment in the rightward turning direction.

According to another aspect of the present invention, in the above-mentioned configurations, it is preferable that the line indicating the greatest values in magnitudes of the vehicle braking/driving force and the vehicle yaw moment is variably set in accordance with a road friction coefficient.

According to another aspect of the present invention, in the above-mentioned configurations, it is preferable that the braking/driving force applying means comprises means for applying driving force to each wheel independently, and means for applying braking force to each wheel independently.

According to another aspect of the present invention, in the above-mentioned configurations, it is preferable that the braking/driving force applying means comprises means for applying common driving force to the right and left wheels, means for controlling the distribution of the driving force to the right and left wheels, and means for applying braking force to each wheel independently.

According to another aspect of the present invention, in the above-mentioned configurations, it is preferable that the means for applying driving force comprises means for applying common driving force to the right and left front wheels, and means for applying common driving force to the right and left rear wheels.

According to another aspect of the present invention, in the above-mentioned configurations, it is preferable that the means for applying driving force comprises means for applying common driving force to the right and left front wheels and the right and left rear wheels, means for controlling the distribution of the driving force to the front and rear wheels, means for controlling the distribution of the driving force to the right and left front wheels, and means for controlling the distribution of the driving force to the right and left rear wheels.

According to another aspect of the present invention, in the above-mentioned configurations, it is preferable that the means for applying driving force comprises an electric motor generator.

According to another aspect of the present invention, in the above-mentioned configurations, it is preferable that the electric motor generator performs regenerative braking upon the braking.

According to another aspect of the present invention, in the above-mentioned configurations, it is preferable that the means for calculating the vehicle target braking/driving force and the vehicle target yaw moment calculates a vehicle target longitudinal acceleration and a vehicle target yaw rate for stably running the vehicle on the basis of at least the amount of the driving operation by an occupant, and calculates the vehicle target driving/braking force and the vehicle target total yaw moment on the basis of the vehicle target longitudinal acceleration and the vehicle target yaw rate.

According to another aspect of the present invention, in the above-mentioned configurations, it is preferable that the control means calculates the target braking/driving force of each wheel on the basis of the vehicle target braking/driving force, the vehicle target yaw moment, and the distribution ratio of the braking/driving force to the front and rear wheels, and controls the braking/driving force applied to each wheel on the basis of the target braking/driving force of each wheel.

BEST MODE FOR CARRYING OUT THE INVENTION

Some preferred embodiments of the present invention will be explained in detail with reference to the accompanying drawings.

First Embodiment

Figure 1:
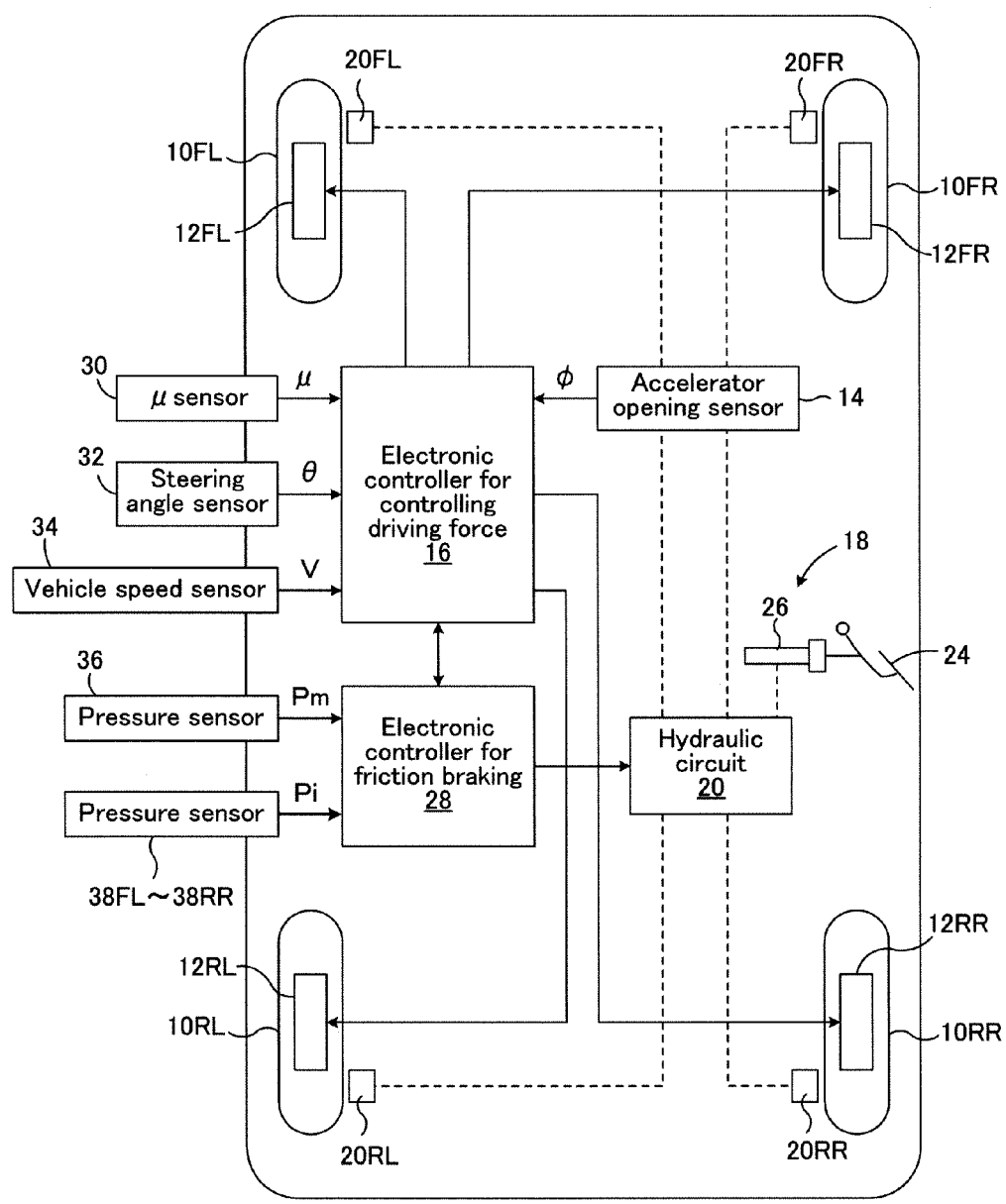
FIG. 1 is a schematic block diagram showing a braking/driving force control apparatus applied to a four-wheel-drive vehicle of a wheel-in-motor type according to a first embodiment of the present invention.

FIG. 1 is a schematic block diagram showing a braking/driving force control apparatus applied to a four-wheel-drive vehicle of a wheel-in-motor type according to a first embodiment of the present invention.

In FIG. 1, numerals 10FL and 10FR respectively represent left and right front wheels that are steering wheels, and numerals 10RL and 10RR respectively represent left and right rear wheels that are non-steering wheels. Electric motor generators 12FL and 12FR that are in-wheel motors are incorporated into the left and right front wheels 10FL and 10FR respectively, whereby the left and right front wheels 10FL and 10FR are driven by the electric motor generators 12FL and 12FR. The electric motor generators 12FL and 12FR also function as regenerative electric generators for each of the left and right front wheels upon the braking, so that they generate regenerative braking force.

Similarly, electric motor generators 12RL and 12RR that are in-wheel motors are incorporated into the left and right rear wheels 10RL and 10RR respectively, whereby the left and right front wheels 10RL and 10RR are driven by the electric motor generators 12RL and 12RR. The electric motor generators 12RL and 12RR also function as regenerative electric generators for each of the left and right rear wheels upon the braking, so that they generate regenerative braking force.

The driving force from each of the electric motor generators 12FL to 12RR is controlled by an electronic controller 16 for controlling driving force on the basis of an accelerator opening φ that is a step-on amount of an accelerator pedal, that is not shown in FIG. 1, detected by an accelerator opening sensor 14. The regenerative braking force from each of the electric motor generators 12FL to 12RR is also controlled by the electronic controller 16 for controlling driving force.

Although not shown in FIG. 1 in detail, the electronic controller 16 for controlling driving force is composed of a microcomputer and a driving circuit, wherein the microcomputer may have a general configuration to include, for example, a CPU, ROM, RAM, and input/output port device, those of which are interconnected with one another via a bi-directional common bus. In a normal running, electric power charged in a battery, which is not shown in FIG. 1, is supplied to each of the electric motor generators 12FL to 12RR, and upon the deceleration and braking of the vehicle, the electric power generated by the regenerative braking by each of the electric motor generators 12FL to 12RR is charged to the battery via the driving circuit.

The friction braking forces of the left and right front wheels 10FL and 10FR and the left and right rear wheels 10RL and 10RR are controlled by controlling braking pressures of corresponding wheel cylinders 22FL, 22FR, 22RL and 22RR by a hydraulic circuit 20 in a friction braking device 18. Although not shown in the figure, the hydraulic circuit 20 includes a reservoir, oil pump, and other various valve devices. In a normal situation, the braking pressure of each wheel cylinder is controlled in accordance with the step-on amount of the brake pedal 24 by a driver and the pressure of a master cylinder 26 that is driven in accordance with the step-on operation of the brake pedal 24. It is controlled as necessary through the control of the oil pump or various valve devices by an electronic controller 28 for controlling braking force, regardless of the step-on amount of the brake pedal 24 by a driver.

Although not shown in FIG. 1 in detail, the electronic controller 28 for controlling braking force is also composed of a microcomputer and a driving circuit, wherein the microcomputer may have a general configuration to include, for example, a CPU, ROM, RAM, and input/output port device, those of which are interconnected with one another via a bi-directional common bus.

Inputted to the electronic controller 16 for controlling driving force are a signal indicating a road friction coefficient $\mu$ from a $\mu$ sensor 30; a signal indicating a steering angle $\theta$ from a steering angle sensor 32; and a signal indicating a vehicle speed V from a vehicle speed sensor 34, in addition to the signal indicating the accelerator opening $\phi$ from the accelerator opening sensor 14. Inputted to the electronic controller 28 for controlling braking force are a signal indicating a master cylinder pressure Pm from a pressure sensor 36 and signals indicating braking pressures (wheel cylinder pressures) Pbi (i=fl, fr, rl, rr) of corresponding wheels from pressure sensors 38FL to 38RR. The electronic controller 16 for controlling driving force and the electronic controller 28 for controlling braking force exchange signals with each other according to need. Note that the steering angle sensor 32 detects a steering angle $\theta$ with the leftward turning direction of the vehicle defined as a positive.

The electronic controller 16 for controlling driving force calculates a vehicle target longitudinal acceleration Gxt on the basis of the accelerator opening $\phi$ and the master cylinder pressure Pm, which indicate an amount of acceleration/deceleration operation by a driver, and calculates a target yaw rate $\gamma$t of the vehicle on the basis of the steering angle $\theta$, which is an amount of steering operation by a driver, and the vehicle speed V through a manner well-known in this technical field. Then, the electronic controller 16 for controlling driving force calculates a target braking/driving force Fvn that is required to the vehicle on the basis of the vehicle target longitudinal acceleration Gxt, and calculates a target total yaw moment Mvnt required to the vehicle on the basis of the vehicle target yaw rate $\gamma$t.

The electronic controller 16 for controlling driving force calculates the vehicle slip angle $\beta$ with a manner well-known in this technical field, calculates the slip angle $\alpha$ of the left and right front wheels on the basis of the vehicle slip angle $\beta$ and the steering angle $\theta$, and calculates a vehicle turning yaw moment Ms due to a lateral force of each wheel on the basis of the slip angle $\alpha$. Then, the electronic controller 16 for controlling driving force calculates the value obtained by subtracting the turning yaw moment Ms from the vehicle target total yaw moment Mvnt as the vehicle target yaw moment Mvn, required to the vehicle, through the control of the braking/driving force of each wheel.

The electronic controller 16 for controlling driving force further calculates the vehicle maximum driving force Fvdmax and the vehicle maximum braking force Fvbmax attainable by the braking/driving forces of the wheels on the basis of the road friction coefficient $\mu$, and calculates the vehicle maximum yaw moment Mvlmax in the leftward turning direction and the vehicle maximum yaw moment Mvrmax in the rightward turning direction attainable by the braking/driving forces of the wheels on the basis of the road friction coefficient $\mu$.

Figure 2A:
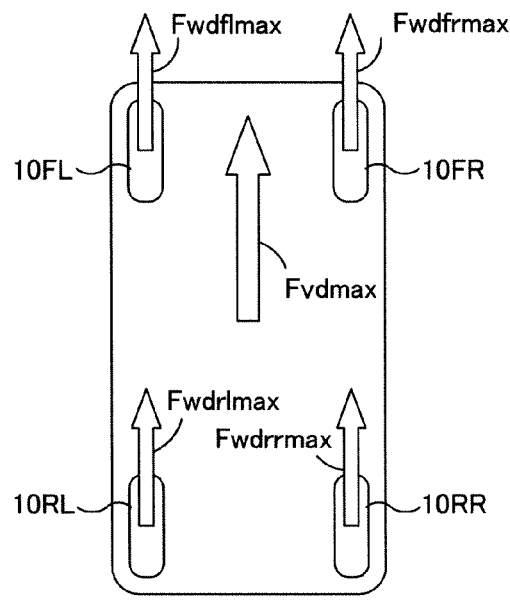
FIG. 2 is an explanatory view for explaining various cases of the relationship between braking/driving force of each wheel and vehicle braking/driving force and the relationship between braking/driving force of each wheel and yaw moment.
Figure 2B:
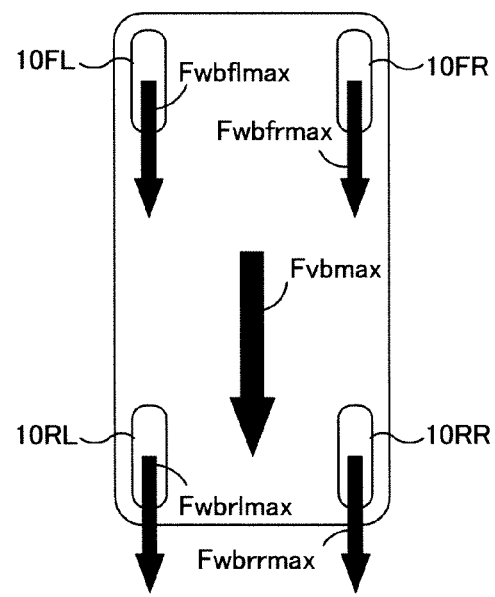

As shown in FIG. 2A, supposing that the vertical load and the friction coefficients to the road surface of the wheels are the same, and the sizes of the friction circles of the wheels are the same, the vehicle maximum driving force Fvdmax under the condition where the yaw moment by the braking/driving forces of the wheels is not acted on the vehicle is achieved when the braking/driving forces Fwxfl and Fwxfr of the left and right front wheels 10FL and 10FR are the maximum driving forces Fwdflmax and Fwdfrmax and the braking/driving forces Fwxrl and Fwxrr of the left and right rear wheels 10RL and 10RR are the maximum driving forces Fwdrlmax and Fwdrrmax. Similarly, as shown in FIG. 2B, the vehicle maximum braking force Fvbmax under the condition where the yaw moment by the braking/driving forces of the wheels is not acted on the vehicle is achieved when the braking/driving forces Fwxfl and Fwxfr of the left and right front wheels 10FL and 10FR are the maximum braking forces Fwbflmax and Fwbfrmax and the braking/driving forces Fwxrl and Fwxrr of the left and right rear wheels 10RL and 10RR are the maximum braking forces Fwbrlmax and Fwbrrmax.

Figure 2C:
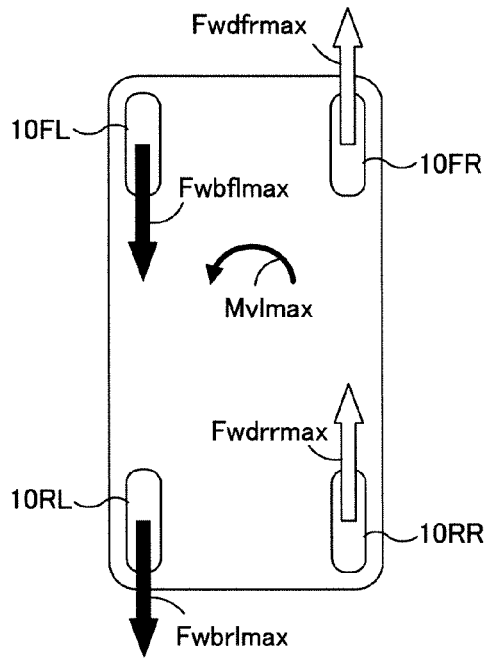
Figure 2D:
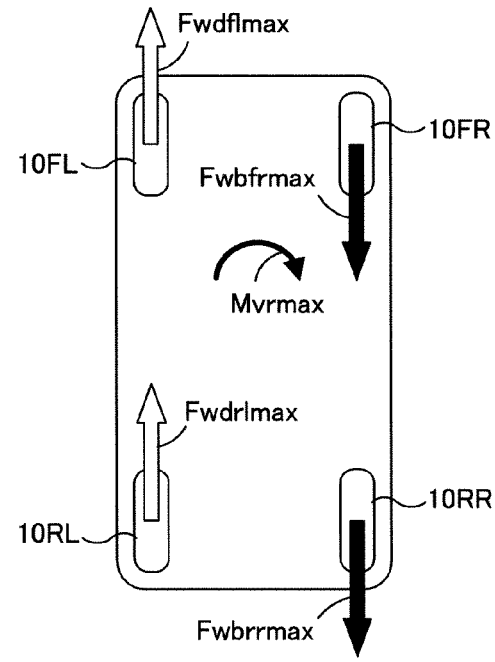

As shown in FIG. 2C, the vehicle maximum yaw moment Mvlmax in the leftward turning direction under the condition where the longitudinal force by the braking/driving forces of the wheels is not acted on the vehicle is achieved when the braking/driving forces Fwxfl and Fwxrl of the front left and rear left wheels 10FL and 10RL are the maximum braking forces Fwbflmax and Fwbrlmax and the braking/driving forces Fwxfr and Fwxrr of the front right and rear right wheels 10FR and 10RR are the maximum driving forces Fwdfrmax and Fwdrrmax. Similarly, as shown in FIG. 2D, the vehicle maximum yaw moment Mvrmax in the rightward turning direction under the condition where the longitudinal force by the braking/driving forces of the wheels is not acted on the vehicle is achieved when the braking/driving forces Fwxfl and Fwxrl of the front left and rear left wheels 10FL and 10RL are the maximum driving forces Fwdflmax and Fwdrlmax and the braking/driving forces Fwxfr and Fwxrr of the front right and rear right wheels 10FR and 10RR are the maximum braking forces Fwbfrmax and Fwbrrmax.

In case where the output torque of each of the electric motor generators 12FL to 12RR is sufficiently great, the maximum driving force and the maximum braking force of each wheel are determined by the road friction coefficient $\mu$, so that, with the vehicle accelerating direction and vehicle leftward turning direction defined as positive, the following relationships are established between the maximum driving force and the maximum braking force of each wheel, the vehicle maximum driving force and the vehicle maximum braking force, and the vehicle maximum yaw moment in the leftward turning direction and the vehicle maximum yaw moment in the rightward turning direction.

$$Fwdfl\max = Fwdfr\max = -Fwbfl\max = -Fwbfr\max$$

$$Fwdrl\max = Fwdrr\max = -Fwbrl\max = -Fwbrr\max$$

$$Fvd\max = -Fvb\max$$

$$Mvl\max = -Mvr\max$$

Since the maximum driving force Fwdimax and the maximum braking force Fwbimax (i=fl, fr, rl, rr) of each wheel are determined by the road friction coefficient $\mu$, the vehicle maximum driving force Fvdmax, vehicle maximum braking force Fvbmax, vehicle maximum yaw moment Mvlmax in the leftward turning direction, and vehicle maximum yaw moment Mvrmax in the rightward turning direction are also determined by the road friction coefficient $\mu$. Accordingly, if the road friction coefficient $\mu$ is found, the vehicle maximum driving force Fvdmax and the other aforesaid values can be estimated.

Figure 4A:
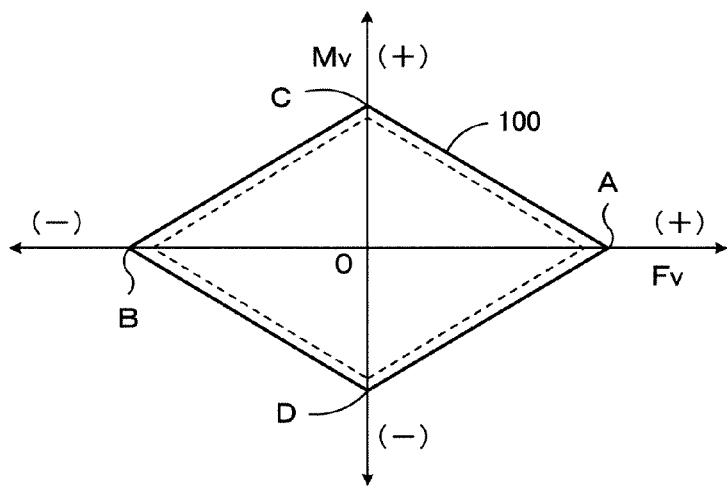
FIG. 4A is a graph showing the range, that can be achieved by the braking/driving force of each wheel, of the vehicle braking/driving force and vehicle yaw moment.

As shown in FIG. 4A, in a rectangular coordinate with the vehicle braking/driving force Fvx as abscissa and the vehicle yaw moment Mv as ordinate, the vehicle braking/driving force Fvx and the vehicle yaw moment Mv that can be achieved by the control of the braking/driving force of each wheel take values within a diamond quadrangle 100 decided by the vehicle maximum driving force Fvdmax, vehicle maximum braking force Fvbmax, vehicle maximum yaw moment Mvlmax in the leftward turning direction, and vehicle maximum yaw moment Mvrmax in the rightward turning direction.

Notably, in FIG. 4, points A to D correspond to the cases A to D in FIG. 2, wherein the coordinates at the points A to D are (Fvdmax, 0), (Fvbmax, 0), (0, Mvimax), and (0, Mvrmax), respectively. As shown by a broken line in FIG. 4A, the quadrangle 100 becomes small as the road friction coefficient μ decreases. Further, as the steering angle θ increases, the lateral force of front left and front right wheels, that are steering wheels, increases, so that the allowance of the longitudinal force becomes small. Therefore, the quadrangle 100 becomes small as the magnitude of the steering angle θ increases.

Supposing that the longitudinal distribution ratio of the vehicle braking/driving force Fv to the rear wheels is defined as Kr (constant of 0<Kr<1), and the vehicle tread is defined as Tr, the following equations 1 to 3 are established. Accordingly, the electronic controller 16 for controlling driving force sets the vehicle target braking/driving force Fvt and the vehicle target yaw moment Mvt by the control of the braking/driving forces of each wheel to the target braking/driving force Fvn and the vehicle target yaw moment Mvn, when the vehicle target braking/driving force Fvn and the vehicle target yaw moment Mvn are within the above-mentioned quadrangle 100. For example, it calculates the values satisfying the following equations 1 to 3 as the target braking/driving forces Fwxti (i=fl, fr, rl, rr) of the wheels by the least square method.

$$Fwxfl + Fwxfr + Fwxrl + Fwxrr = Fvt \quad (1)$$

$$\{Fwxfr + Fwxrr - (Fwxfl + Fwxrl)\} Tr/2 = Mvt \quad (2)$$

$$(Fwxfl + Fwxfr)Kr = (Fwxrl + Fwxrr)(1 - Kr) \quad (3)$$

When the vehicle target braking/driving force Fvn and the vehicle target yaw moment Mvn are outside the range of the above-mentioned quadrangle 100, the electronic controller 16 for controlling driving force calculates the vehicle target braking/driving force Fvt and the vehicle target yaw moment Mvt such that the magnitude of the vehicle braking/driving force Fv and the magnitude of the yaw moment Mv by the target braking/driving forces Fwxti of the wheels become respectively the maximum within the range where the ratio of the vehicle target braking/driving force Fvt and the yaw moment Mvt by the braking/driving forces of the wheels becomes the ratio of the target braking/driving force Fvn and the target yaw moment Mvn, required to the vehicle, by the braking/driving forces of the wheels. Then, the electronic controller 16 for controlling driving force calculates the values satisfying the foregoing equations 1 to 3 as the target braking/driving forces Fwxti of the wheels by the least square method, for example.

When the target braking/driving force Fwxti of each wheel takes a positive value that means it is a driving force, the electronic controller 16 for controlling driving force sets the target friction braking force Fwbti and the target regenerative braking force Fwrti (i=fl, fr, rl, rr) of each wheel to zero, outputs the signals indicating the target friction braking forces Fwbti to the electronic controller 28 for controlling braking force, sets the target driving force Fwdti (i=fl, fr, rl, rr) of each wheel to the associated target braking/driving force Fwxti, calculates the target driving currents Iti (i=fl, fr, rl, rr) to the electric motor generators 12FL to 12RR by unillustrated maps or functions on the basis of the target driving forces Fwdti, and controls the driving currents applied to the electric motor generators 12FL to 12RR on the basis of the target driving currents Iti, thereby controlling the driving force of each wheel such that the braking/driving force Fwxi of each wheel becomes the associated target braking/driving force Fwxti.

On the other hand, when the target braking/driving forces Fwxti of each wheel takes a negative value which means that the target braking/driving force Fwxti is a braking force and the target braking/driving force Fwxti is not more than the maximum regenerative braking force of each wheel, the electronic controller 16 for controlling driving force sets the target driving force Fwdti and the target friction braking force Fwbti of each wheel to zero, sets the target regenerative braking force Fwrti to the target braking/driving force Fwxti, and controls the electric motor generators 12FL to 12RR such that the regenerative braking force becomes the target regenerative braking force Fwrti.

When the target braking/driving force Fwxti of each wheel takes a negative value which means that the target braking/driving force Fwxti is a braking force and the target braking/driving force Fwxti is greater than the maximum regenerative braking force of each wheel, the electronic controller 16 for controlling driving force sets the target driving force Fwdti of each wheel to zero, sets the target regenerative braking force Fwrti of each wheel to the maximum regenerative braking force Fwxrimax (i=fl, fr, rl, rr), and controls the electric motor generators 12FL to 12RR such that the regenerative braking force becomes the maximum regenerative braking force Fwxrimax. Further, it calculates the braking force that corresponds to the difference between the target braking/driving force Fwxti and the maximum regenerative braking force Fwxrimax as the target friction braking force Fwbti (i=fl, fr, rl, rr), and outputs the signals indicating the target friction braking forces Fwbti of the wheels to the electronic controller 28 for controlling braking force.

The electronic controller 28 for controlling braking force calculates the target braking pressure Pbti (i=fl, fr, rl, rr) of each wheel on the basis of the target friction braking force Fwbti of each wheel inputted from the electronic controller 16 for controlling driving force, and controls the hydraulic circuit 20 such that the braking pressure Pbi of each wheel becomes the associated target braking pressure Pbti, and the friction braking force Fwbi (i=fl, fr, rl, rr) of each wheel thereby becomes the associated target friction braking force Fwbti of each wheel.

Figure 3:
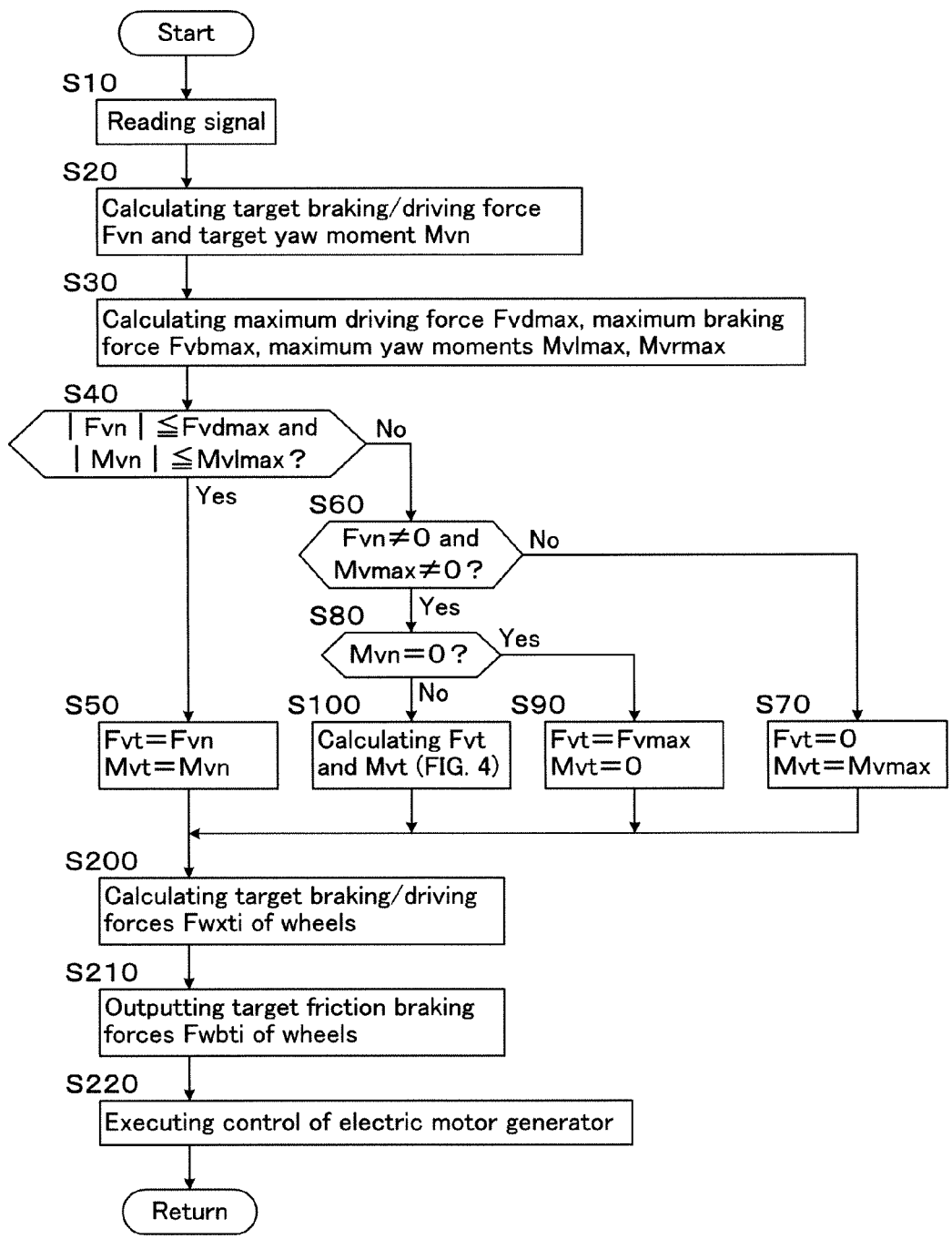
FIG. 3 is a flowchart showing a braking/driving force control routine executed by an electronic controller for controlling driving force in the first embodiment.

The braking/driving force control achieved by the electronic controller 16 for controlling driving force in the first embodiment will now be explained with reference to the flowchart shown in FIG. 3. The control by the flowchart shown in FIG. 3 is started by the activation of the electronic controller 16 for controlling driving force, and it is repeatedly executed every predetermined time until an ignition switch, not shown, is turned off.

At Step 10, the signals indicating the accelerator opening φ detected by the accelerator opening sensor 14 and the like are firstly read. At Step 20, the vehicle target braking/driving force Fvn and vehicle target yaw moment Mvn that are required to the vehicle and caused by the control of the braking/driving force of each wheel are calculated in the aforesaid manner on the basis of the accelerator opening φ and the like.

At Step 30, the vehicle maximum driving force Fvdmax, vehicle maximum braking force Fvbmax, vehicle maximum yaw moment Mvlmax in the leftward turning direction, and vehicle maximum yaw moment Mvrmax in the rightward direction, attainable by the braking/driving force of each wheel, are calculated by maps or functions, not shown, on the basis of the road friction coefficient μ. Specifically, the points A to D shown in FIG. 4 are specified.

At Step 40, it is determined whether or not the absolute value of the target braking/driving force Fvn is not more than the vehicle maximum driving force Fvdmax and the absolute value of the vehicle target yaw moment Mvn is not more than the vehicle maximum yaw moment Mvimax, i.e., it is determined whether the vehicle target braking/driving force Fvn and the vehicle target yaw moment Mvn are within the range of the quadrangular 100 or not and the target braking/driving force Fvn and the target yaw moment Mvn can be achieved or not through the control of the braking/driving force of each wheel. When the negative determination is made, the program proceeds to Step 60. When the positive determination is made, the vehicle target braking/driving force Fvt and the vehicle target yaw moment Mvt after the modification are respectively set to the target braking/driving force Fvn and the target yaw moment Mvn at Step 50, and then, the program proceeds to Step 200.

At Step 60, it is determined whether the target braking/driving force Fvn is zero or not and the vehicle maximum yaw moments Mvlmax and Mvrmax (correctively referred to as Mvmax) are zero or not. When it is determined that the target braking/driving force Fvn is not zero and Mvimax and Mvrmax are not zero, the program proceeds to Step 80. When it is determined that the target braking/driving force Fvn is zero and Mvimax and Mvrmax are zero, the vehicle target braking/driving force Fvt after the modification is set to zero and the vehicle target yaw moment Mvt after the modification is set to the maximum yaw moment Mvmax at Step 70, and then, the program proceeds to Step 200. In this case, the vehicle target yaw moment Mvt after the modification is set to the maximum yaw moment Mvlmax when the target yaw moment Mvn takes a positive value, while set to the maximum yaw moment Mvrmax when the target yaw moment Mvn takes a negative value.

At Step 80, it is determined whether the target yaw moment Mvn is zero or not. When the negative determination is made, the program proceeds to Step 100. When the positive determination is made, at step 90, the vehicle target braking/driving force Fvt after the modification is set to the maximum driving force Fvdmax, when the target braking/driving force Fvn takes a positive value, while the vehicle target braking/driving force Fvt after the modification is set to the maximum braking force Fvbmax, when the target braking/driving force Fvn takes a negative value, and further, the vehicle target yaw moment Mvt after the modification is set to zero, and then, the program proceeds to Step 200.

Figure 4B:
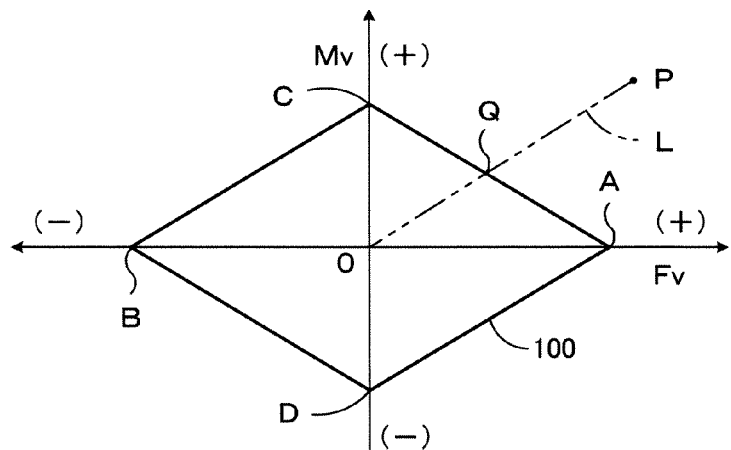
FIG. 4B is an explanatory view showing a manner of a calculation of a vehicle target braking/driving force Fvt and a vehicle target yaw moment Mvt in case where a vehicle target braking/driving force Fvn and a vehicle target yaw moment Mvn are outside the range that can be achieved by the control of the braking/driving force of each wheel.
Figure 4C:
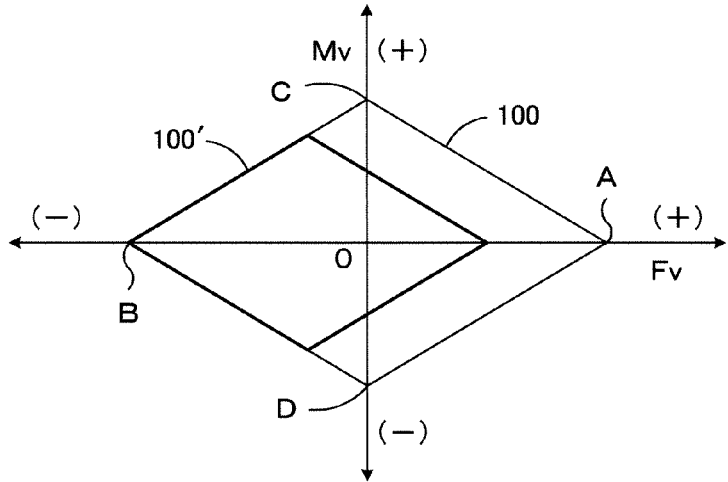
FIG. 4C is an explanatory view showing the range, that can be achieved by the control of the braking/driving force of each wheel, of the vehicle target braking/driving force Fvt and the vehicle target yaw moment Mvt in the vehicle having a driving source provided only at the right and left front wheels or at the right and left rear wheels.

At Step 100, the point of intersection Q of the segment L, which links the point P that shows the vehicle target braking/driving force Fvn and the vehicle target yaw moment Mvn, and the origin O and the outer line of the quadrangular 100 is obtained as the target point, as shown in FIG. 4B, and if the coordinate of the target point Q is defined as (Fvq, Mvq), the vehicle target braking/driving force Fvt after the modification and the vehicle target yaw moment Mvt after the modification are set respectively to Fvq and Mvq. Thereafter, the program proceeds to Step 200.

At Step 200, the target braking/driving force Fwxti (i=fl, fr, rl, rr) of each wheel to achieve the target braking/driving force Fvt and the target yaw moment Mvt is calculated in the above-mentioned manner on the basis of the vehicle target braking/driving force Fvt after the modification and the vehicle target yaw moment Mvt after the modification.

At Step 210, the target friction braking force Fwbti is calculated in the aforesaid manner, and the signals indicating the target friction braking forces Fwbti are outputted to the electronic controller 28 for controlling braking force, whereby the electronic controller 28 for controlling braking force makes a control such that the friction braking force Fwbi of each wheel becomes the associated target friction braking force Fwbti.

At Step 220, each of the electric motor generators 12FL to 12RR is controlled such that the driving force Fwdi or the regenerative braking force Fwri of each wheel respectively becomes the target driving force Fwdti or the target regenerative braking force Fwrti.

According to the illustrated first embodiment, the vehicle target braking/driving force Fvn and the vehicle target yaw moment Mvn, required to the vehicle, through the control of the braking/driving forces of the wheels are calculated at Step 20, the vehicle maximum driving force Fvdmax, vehicle maximum braking force Fvbmax, vehicle maximum yaw moment Mvimax in the leftward turning direction, and the vehicle maximum yaw moment Mvrmax in the rightward turning direction, those of which are attainable by the braking/driving forces of the wheels, are calculated at Step 30, and it is determined at Step 40 whether or not the target braking/driving force Fvn and the target yaw moment Mvn can be achieved through the control of the braking/driving forces of the wheels.

When it is determined at Step 40 that the target braking/driving force Fvn and the target yaw moment Mvn cannot be achieved through the control of the braking/driving force of each wheel, Steps 60 to 100 are executed. When the target braking/driving force Fvn is zero, the vehicle target braking/driving force Fvt after the modification is set to zero and the vehicle target yaw moment Mvt after the modification is set to the maximum yaw moment Mvmax at Step 70. When the target yaw moment Mvn is zero, at step 90, the vehicle target braking/driving force Fvt after the modification is set to the maximum driving force Fvdmax, when the target braking/driving force Fvn takes a positive value, while the vehicle target braking/driving force Fvt after the modification is set to the maximum braking force Fvbmax, when the target braking/driving force Fvn takes a negative value, and further, the vehicle target yaw moment Mvt after the modification is set to zero.

When the target braking/driving force Fvn and the target yaw moment Mvn are not 0 under the condition where the target braking/driving force Fvn and the target yaw moment Mvn cannot be achieved by the control of the braking/driving force of each wheel, the point of intersection Q of the segment L, which links the point P that shows the vehicle target braking/driving force Fvn and the vehicle target yaw moment Mvn and the origin O, and the outer line of the quadrangular 100 is obtained as the target point, and the vehicle target braking/driving force Fvt after the modification and the vehicle target yaw moment Mvt after the modification are set respectively to Fvq and Mvq that are the values at the point Q at Step 100.

Consequently, according to the illustrated first embodiment, when the vehicle is under the condition where the target braking/driving force Fvn and the target yaw moment Mvn cannot be achieved by the control of the braking/driving force of each wheel, the vehicle target braking/driving force Fvt after the modification and the vehicle target yaw moment Mvt after the modification are be calculated such that, within the range where the ratio of the vehicle target braking/driving force Fvt and the yaw moment Mvt after the modification through the control of the braking/driving forces of the wheels coincides with the ratio of the target braking/driving force Fvn and the target yaw moment Mvn through the control of the braking/driving forces of the wheels required to the vehicle, the vehicle braking/driving force Fv and the yaw moment Mv by the target braking/driving forces Fwxti of the wheels take the greatest values. Therefore, the braking/driving forces of the wheels are controlled such that the ratio of the vehicle braking/driving force and the yaw moment surely coincides with the ratio of the target braking/driving forces and the target yaw moment, with the result that the braking/driving force and the yaw moment required to the vehicle can be achieved as much as possible within the range of the braking/driving forces that can be generated by the wheels.

In particular, in the illustrated first embodiment, the driving sources for the wheels are electric motor generators 12FL to 12RR provided on each wheel. In case where the target braking/driving forces Fwxti of the wheels take negative values, which means the target braking/driving forces Fwxti are braking forces, the regenerative braking forces by the electric motor generators 12FL to 12RR are used. Accordingly, the vehicle motion energy can effectively be returned as electric energy upon the braking operation for deceleration, while achieving the braking/driving force and the yaw moment required to the vehicle as much as possible within the range of the braking/driving forces that can be generated by the wheels.

While, in the illustrated first embodiment, the electric motor generators 12FL to 12RR are in-wheel motors, the electric motor generators may be provided at the vehicle body. Further, the electric motor generators as driving sources for wheels may not perform regenerative braking. The driving source may be other than the electric motor generator so long as it can increase or decrease the driving force of each wheel independently.

Although the electric motor generators 12FL to 12RR are provided so as to correspond to four wheels in the illustrated first embodiment, this embodiment may be applied to a vehicle having driving sources provided only at the left and right front wheels or left and right rear wheels. In this case, the quadrangle 100 takes a form shown by 100' in FIG. 4C, and when the vehicle yaw moment in the leftward turning direction and the vehicle yaw moment in the rightward turning direction are the maximum values Mvlmax and Mvrmax respectively, the vehicle braking/driving force takes a negative value, which means that the vehicle braking/driving force is a braking force. The above-mentioned effects can also be achieved with this vehicle.

Second Embodiment

Figure 5:
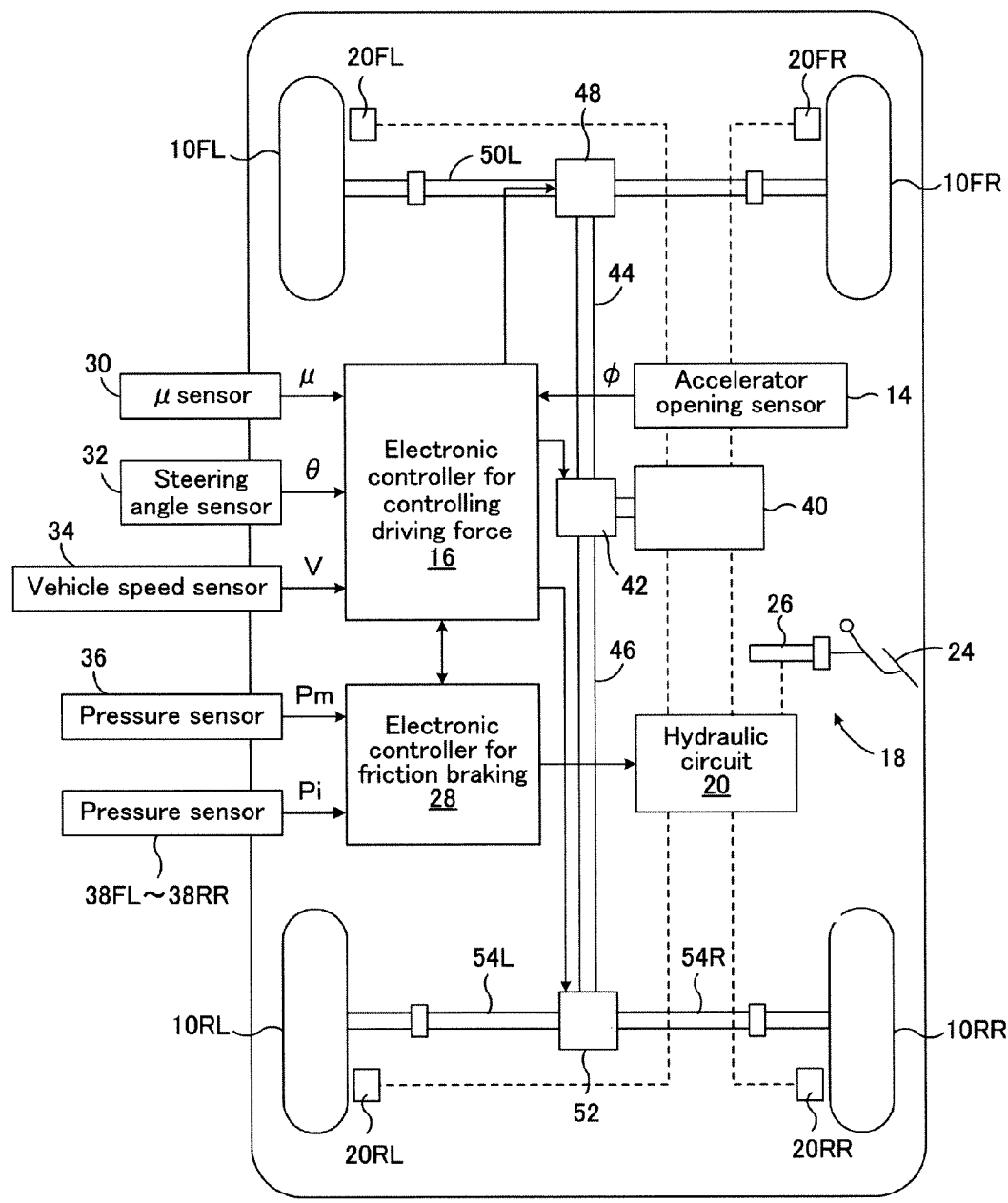
FIG. 5 is a schematic block diagram showing a vehicle braking/driving force control apparatus applied to a four-wheel-drive vehicle in which driving force and regenerative braking force from a single electric motor generator, which is common to four wheels, are controlled so as to be distributed to the four wheels according to a second embodiment of the present invention.

FIG. 5 is a schematic block diagram showing a braking/driving force control apparatus applied to a four-wheel-drive vehicle in which driving force and regenerative braking force from a single electric motor generator, which is common to four wheels, are controlled so as to be distributed to front and rear wheels and right and left wheels according to a second embodiment of the present invention. The components in FIG. 5 same as those in FIG. 1 are identified by the same numerals in FIG. 1.

In this second embodiment, an electric motor generator 40 is provided that serves as a driving source common to the front left wheel 10FL, front right wheel 10FR, rear left wheel 10RL, and rear right wheel 10RR. The driving force or the regenerative braking force from the electric motor generator 40 is transmitted to a front-wheel propeller shaft 44 and rear-wheel propeller shaft 46 through a center differential 42 that can control the distribution ratio to the front wheels and rear wheels.

The driving force or the regenerative braking force of the front-wheel propeller shaft 44 is transmitted to the front-left wheel axle 50L and front-right wheel axle 50R by a front-wheel differential 48 that can control the distribution ratio to the front-left wheel and front-right wheel, whereby the front-left wheel 10FL and front-right wheel 10FR are rotatably driven. Similarly, the driving force or the regenerative braking force of the rear-wheel propeller shaft 46 is transmitted to the rear-left wheel axle 54L and rear-right wheel axle 54R by a rear-wheel differential 52 that can control the distribution ratio of the rear-left wheel and rear-right wheel, whereby the rear-left wheel 10RL and rear-right wheel 10RR are rotatably driven.

The driving force of the electric motor generator 40 is controlled by the electronic controller 16 for controlling driving force on the basis of the accelerator opening $\phi$ detected by the accelerator opening sensor 14. The regenerative braking force of the electric motor generator 40 is also controlled by the electronic controller 16 for controlling driving force. The electronic controller 16 for controlling driving force controls the distribution ratio of the driving force and regenerative braking force to the front wheels and rear wheels by the center differential 42, controls the distribution ratio of the driving force and regenerative braking force to the left wheels and right wheels by the front-wheel differential 48, and controls the distribution ratio of the driving force and regenerative braking force to the left wheels and right wheels by the rear-wheel differential 52.

In this second embodiment too, the electronic controller 16 for controlling driving force calculates, in the same manner as in the first embodiment, the target braking/driving force Fvn, required to the vehicle, through the control of the braking/driving force of each wheel, the vehicle target yaw moment Mvn, required to the vehicle, through the control of the braking/driving force of each wheel, the vehicle maximum driving force Fvdmax, the vehicle maximum braking force Fvbmax, the vehicle maximum yaw moment Mvlmax in the leftward turning direction, and the vehicle maximum yaw moment Mvrmax in the rightward turning direction by the braking/driving force of each wheel.

In the illustrated second embodiment, it is assumed that the driving forces Fwdi of the wheels when the maximum driving force of the electric motor generator 40 is uniformly distributed to the front-left wheel 10FL, front-right wheel 10FR, rear-left wheel 10RL and rear-right wheel 10RR is smaller than the producible maximum longitudinal force that is determined by the friction coefficient $\mu$ of the normal road surface.

Figure 6A:
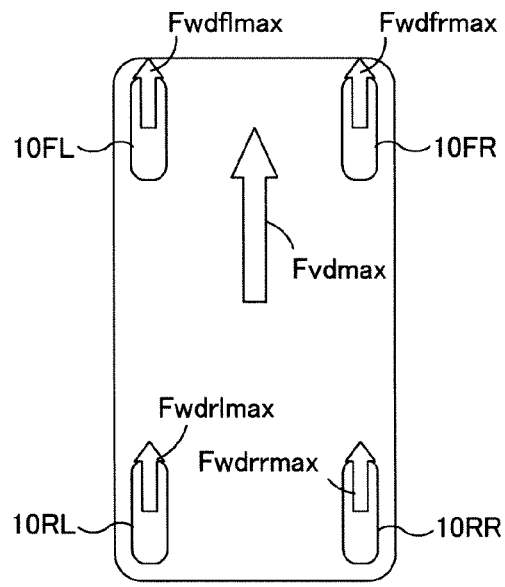
FIG. 6 is an explanatory view for explaining various cases of the relationship between braking/driving force of each wheel and vehicle braking/driving force and the relationship between braking/driving force of each wheel and vehicle yaw moment in the second embodiment.

As shown in FIG. 6A, the vehicle maximum driving force Fvdmax under the condition where the yaw moment by the braking/driving forces of the wheels is not acted on the vehicle is achieved when the braking/driving forces Fwxfl and Fwxfr of the front-left wheel 10FL and front-right wheel 10FR are the maximum driving forces Fwdflmax and Fwdfrmax in case where the distribution of the driving force to the right and left wheels is equal, and the braking/driving forces Fwxrl and Fwxrr of the rear-left wheel 10RL and rear-right wheel 10RR are the maximum driving forces Fwdrlmax and Fwdrrmax in case where the distribution of the driving force to the right and left wheels is equal.

Figure 6B:
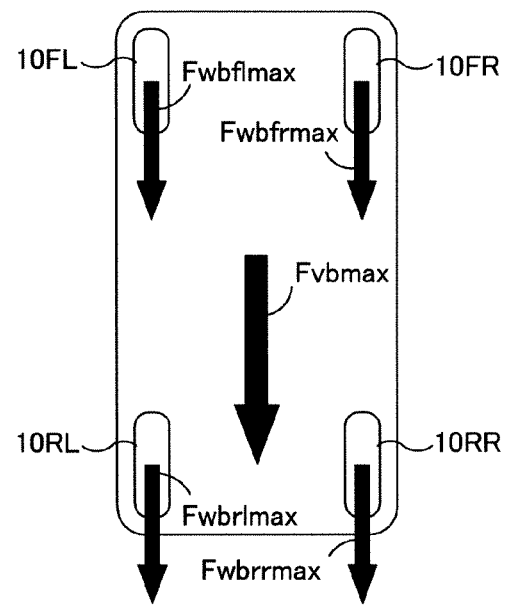

Similarly, as shown in FIG. 6B, the vehicle maximum braking force Fvbmax under the condition where the yaw moment by the braking/driving force of the wheels is not acted on the vehicle is achieved when the braking/driving forces Fwxfl and Fwxfr of the front-left wheel 10FL and front-right wheel 10FR are the maximum braking forces Fwbflmax and Fwbfrmax in case where the distribution of the braking force to the right and left wheels is equal, and the braking/driving forces Fwxrl and Fwxrr of the rear-left wheel 10RL and rear-right wheel 10RR are the maximum braking forces Fwbrlmax and Fwbrrmax in case where the distribution of the braking force to the right and left wheels is equal.

Figure 6C:
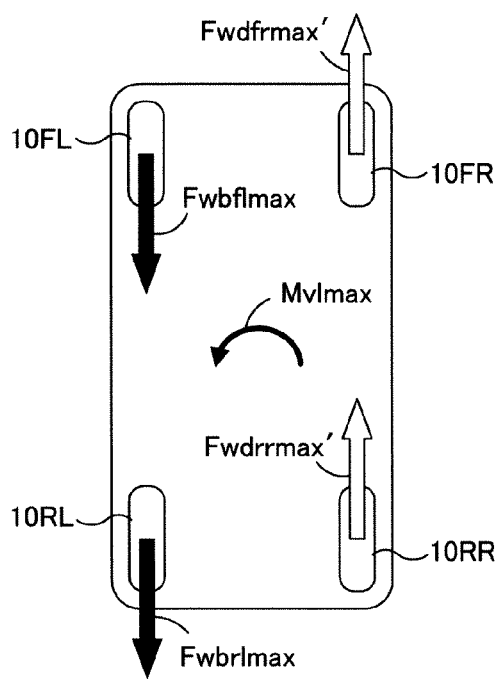

As shown in FIG. 6C, the vehicle maximum yaw moment Mvlmax in the leftward turning direction under the condition where the longitudinal force by the braking/driving forces of the wheels is not acted on the vehicle is achieved in case where the driving force is distributed to the right wheels, the braking/driving forces Fwxfr and Fwxrr of the front-right wheel 10FR and rear-right wheel 10RR are the maximum driving forces Fwdfrmax' and Fwdrrmax', and their magnitudes are equal to the magnitudes of the maximum braking forces Fwbflmax and Fwbrlmax of the front-left wheel 10FL and rear-left wheel 10RL respectively.

Figure 6D:
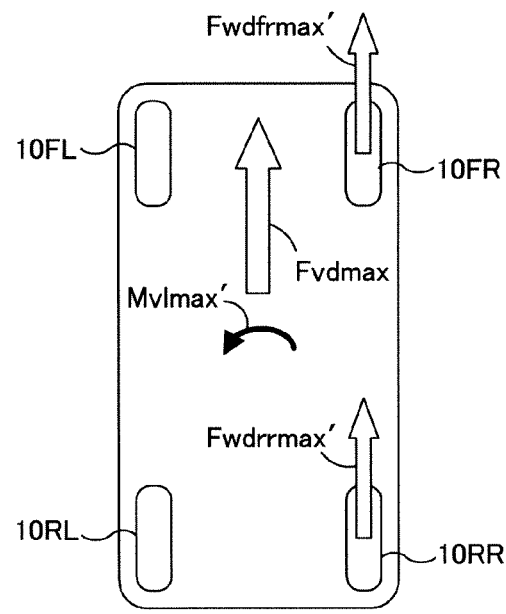

As shown in FIG. 6D, the vehicle maximum yaw moment Mvimax' in the leftward turning direction under the condition where the vehicle braking/driving force is the maximum driving force Fvdmax is achieved in case where the braking/driving forces Fwxfl and Fwxrl of the front-left wheel 10FL and rear-left wheel 10RL are respectively 0, and the braking/driving forces Fwxfr and Fwxrr of the front-right wheel 10FR and rear-right wheel 10RR are the maximum driving forces Fwdflmax' and Fwdrrmax'.

Figure 7A:
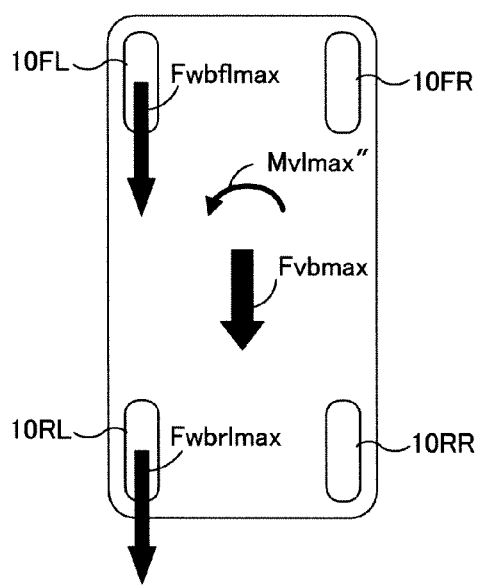
FIG. 7 is an explanatory view for explaining other various cases of the relationship between braking/driving force of each wheel and vehicle braking/driving force and the relationship between braking/driving force of each wheel and vehicle yaw moment in the second embodiment.
Figure 7B:
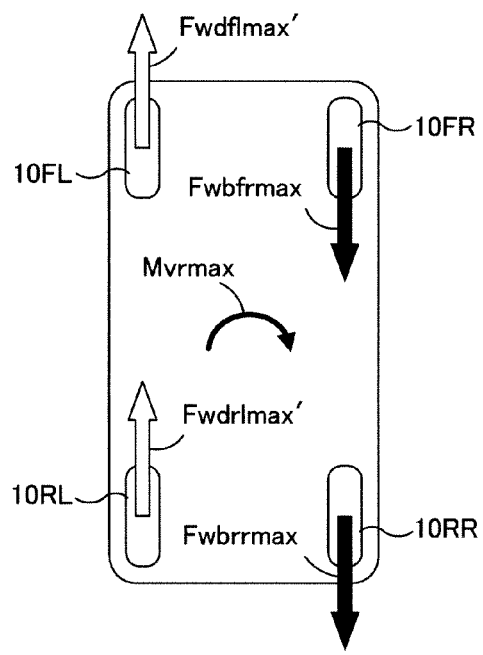
Figure 7C:
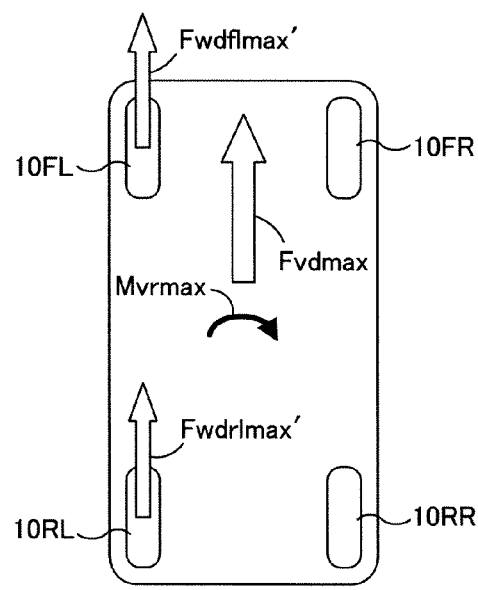
Figure 7D:
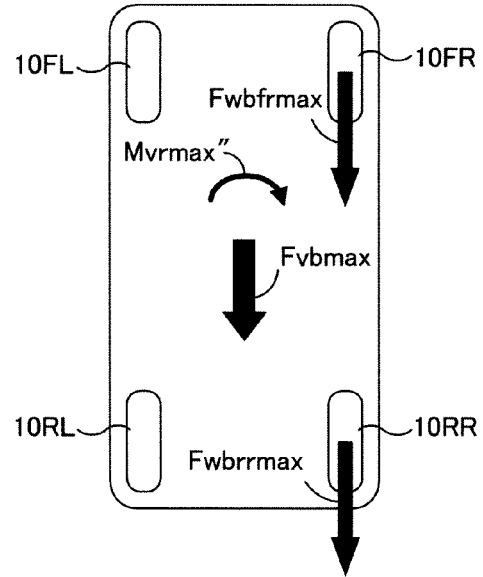

As shown in FIG. 7E, the vehicle maximum yaw moment Mvimax" in the leftward turning direction under the condition where the driving force is not acted on any wheels is achieved in case where the braking/driving forces Fwxfr and Fwxrr of the front-right wheel 10FR and rear-right wheel 10RR are respectively 0, and the braking/driving forces Fwxfl and Fwxrl of the front-left wheel 10FL and rear-left wheel 10RL are the maximum braking forces Fwbflmax and Fwbrimax.

As shown in FIG. 7F, the vehicle maximum yaw moment Mvrmax in the rightward turning direction under the condition where the longitudinal force by the braking/driving forces of the wheels is not acted on the vehicle is achieved in case where the driving force is distributed to the left wheels, the braking/driving forces Fwxfl and Fwxrl of the front-left wheel 10FL and rear-left wheel 10RL are the maximum driving forces Fwdflmax' and Fwdrlmax', and their magnitudes are equal to the magnitudes of the maximum braking forces Fwbfrmax and Fwbrrmax of the front-right wheel 10FR and rear-right wheel 10RR respectively.

As shown in FIG. 7G, the vehicle maximum yaw moment Mvrmax' in the rightward turning direction under the condition where the vehicle braking/driving force is the maximum driving force Fvdmax is achieved in case where the braking/driving forces Fwxfr and Fwxrr of the front-right wheel 10FR and rear-right wheel 10RR are respectively 0, and the braking/driving forces Fwxfl and Fwxrl of the front-left wheel 10FL and rear-left wheel 10RL are the maximum driving forces Fwdflmax' and Fwdrlmax'.

As shown in FIG. 7H, the vehicle maximum yaw moment Mvrmax" in the rightward turning direction under the condition where the driving force is not acted on any wheels is achieved in case where the braking/driving forces Fwxfl and Fwxrl of the front-left wheel 10FL and rear-left wheel 10RL are respectively 0, and the braking/driving forces Fwxfr and Fwxrr of the front-right wheel 10FR and rear-right wheel 10RR are the maximum braking forces Fwbfrmax and Fwbrrmax.

The maximum driving forces Fwdimax of the wheels are determined by the maximum output torque of the electric motor generator 40, the road friction coefficient $\mu$, and each distribution ratio, and the maximum braking forces Fwbimax of the wheels are determined by the road friction coefficient $\mu$. Therefore, the vehicle maximum driving force Fvdmax, vehicle maximum braking force Fvbmax, vehicle maximum yaw moment Mvimax in the leftward turning direction, and vehicle maximum yaw moment Mvrmax in the rightward turning direction are also determined by the maximum output torque of the electric motor generator 40 and the road friction coefficient $\mu$. Accordingly, if the maximum output torque of the electric motor generator 40 and the road friction coefficient $\mu$ are found, the vehicle maximum driving force Fvdmax and the other values can be estimated.

Figure 9A:
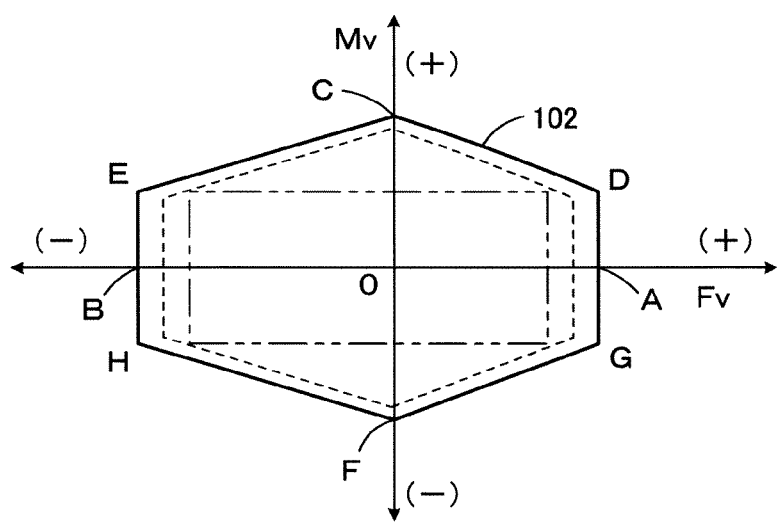
FIG. 9A is a graph showing the range, that can be achieved by the control of the braking/driving force of each wheel, of the vehicle braking/driving force and vehicle yaw moment.

As shown in FIG. 9A, in a rectangular coordinate with the vehicle braking/driving force Fvx as abscissa and the vehicle yaw moment Mv as ordinate, the vehicle braking/driving force Fvx and the vehicle yaw moment Mv that are attainable by the control of the braking/driving force of each wheel take values within a hexagon 104 decided by the vehicle maximum driving force Fvdmax, vehicle maximum braking force Fvbmax, vehicle maximum yaw moment Mvlmax in the leftward turning direction, vehicle maximum yaw moment Mvrmax in the rightward turning direction, and the variable range of the vehicle yaw moment Mv when vehicle braking/driving force Fvx are the maximum driving force Fvdmax or maximum braking force Fvbmax.

Notably, in FIG. 9, points A to H correspond to the cases A to H in FIGS. 6 and 7. As shown by a broken line in FIG. 9A, the hexagon 102 becomes small as the road friction coefficient $\mu$ decreases. Further, as the magnitude of the steering angle $\theta$ increases, the lateral force of front left and front right wheels, that are steerable wheels, increases, so that the allowance of the longitudinal force becomes small. Therefore, the hexagon 102 becomes small as magnitude of the steering angle $\theta$ increases.

When the output torque of the electric motor generator 40 is sufficiently great, the maximum driving force and maximum braking force of each wheel are determined by the road friction coefficient $\mu$. Therefore, supposing that the vehicle accelerating direction and the vehicle leftward turning direction are defined as positive, the relationships between the maximum driving force and maximum braking force of each wheel, the vehicle maximum driving force and vehicle maximum braking force, and vehicle maximum yaw moment in the leftward turning direction and vehicle maximum yaw moment in the rightward turning direction are equal to those in the above-mentioned first embodiment. Accordingly, the range of the vehicle driving force and yaw moment that can be achieved by the braking/driving forces of the wheels becomes the range of the diamond like the first embodiment.

Further, when the output torque of the electric motor generator 40 and the maximum braking force of each wheel are smaller than those in the embodiment, the vehicle driving force becomes the maximum even if all the maximum driving force is distributed to the left wheels or right wheels, and the vehicle braking force becomes the maximum even if all the braking forces is distributed to the left wheels or right wheels. Therefore, as indicated by a phantom line in FIG. 9A, the range of the vehicle driving force and yaw moment that can be achieved by the braking/driving forces of the wheels becomes the range of the rectangle.

The coordinates at the points A to H shown in FIG. 12 are (Fvdmax, 0), (Fvbmax, 0), (0, Mvimax), (Fvdmax, KmMvlmax), (Fvbmax, KmMvlmax), (0, Mvrmax), (Fvdmax, −KmMvimax), and (Fvbmax, −KmMvlmax), respectively, supposing that the coefficient Km is defined as not less than 0 and not more than 1.

Supposing that the longitudinal distribution ratio of the braking/driving force Fwxi to the rear wheels is defined as Kr (constant of $0<Kr<1$), the lateral distribution ratio of the braking/driving force Fwxi to the right wheels is defined as Ky ($0 \leq Kr \leq 1$) for the front wheels and rear wheels, and the vehicle tread is defined as Tr, the following equations 4 to 7 are established. Accordingly, the electronic controller 16 for controlling driving force sets the vehicle target braking/driving force Fvt and the vehicle target yaw moment Mvt after the modification by the control of the braking/driving force of each wheel to the target braking/driving force Fvn and the vehicle target yaw moment Mvn, when the vehicle target braking/driving force Fvt and the vehicle target yaw moment Mvt are within the above-mentioned hexagon 102. For example, it calculates the values satisfying the following equations 4 to 7 as the target braking/driving force Fwxti (i=fl, fr, rl, rr) and the lateral distribution ratio Ky to the right wheels by the least square method.

$$Fwxfl+Fwxfr+Fwxrl+Fwxrr=Fvt \quad (4)$$

$$\{Fwxfr+Fwxrr-(Fwxfl+Fwxrl)\}Tr/2=Mvt \quad (5)$$

$$(Fwxfl+Fwxfr)Kr=(Fwxrl+Fwxrr)(1-Kr) \quad (6)$$

$$(Fwxfl+Fwxrl)Ky=(Fwxfr+Fwxrr)(1-Ky) \quad (7)$$

When the vehicle target braking/driving force Fvn and the vehicle target yaw moment Mvn are outside the range of the above-mentioned hexagon 102, the electronic controller 16 for controlling driving force calculates the vehicle target braking/driving force Fvt and the vehicle target yaw moment Mvt after the modification such that the magnitude of the vehicle braking/driving force Fv and the magnitude of the yaw moment Mv by the target braking/driving forces Fwxti of the wheels become respectively the maximum within the range where the ratio of the vehicle target braking/driving force Fvt and the yaw moment Mvt after the modification by the braking/driving forces of the wheels becomes the ratio of the target braking/driving force Fvn and the target yaw moment Mvn, required to the vehicle, by the braking/driving forces of the wheels. Then, the electronic controller 16 for controlling driving force calculates the values satisfying the foregoing equations 4 to 7 as the target braking/driving forces Fwxti of the wheels and the lateral distribution ratio Ky to the right wheels by the least square method, for example.

When the vehicle braking/driving force Fv takes a positive value which means the vehicle braking/driving force Fv is a driving force, and the target braking/driving forces Fwxti of the wheels are positive values that means the braking/driving forces Fwxti are driving forces, the electronic controller 16 for controlling driving force sets the target friction braking forces Fwbti and the target regenerative braking forces Fwrti (i=fl, fr, rl, rr) of the wheels to zero, outputs the signals indicating the target friction braking forces Fwbti to the electronic controller 28 for controlling braking force, and sets the target driving forces Fwdti (i=fl, fr, rl, rr) of the wheels to the target braking/driving forces Fwxti.

Then, the electronic controller 16 for controlling driving force calculates the target driving current It to the electric motor generator 40 and the lateral distribution ratio Ky to the right wheels by unillustrated maps or functions on the basis of the target driving forces Fwdti, and controls the driving current applied to the electric motor generator 40 on the basis of the target driving current It as well as controls the front-wheel differential 48 and the rear-wheel differential 52 on the basis of the lateral distribution ratio Ky to the right wheels, thereby controlling the driving force of each wheel such that the braking/driving forces Fwxi of the wheels becomes the target braking/driving force Fwxti.

On the other hand, when the vehicle braking/driving force Fv takes a positive value that means the vehicle braking/driving force Fv is a driving force, but the target braking/driving force Fwxti of any one of wheels takes a negative value that means it is a braking force, and when the vehicle braking/driving force Fv takes a negative value that means it is a braking force, but the target braking/driving force Fwxti of any one of wheels takes a positive value that means it is a driving force, the electronic controller 16 for controlling driving force determines the lateral distribution ratio Ky to the right wheels such that the driving force is distributed only to the side where the target braking/driving forces Fwxti take positive values, calculates the target driving current It to the electric motor generator 40 on the basis of the sum of the positive target braking/driving forces Fwxti, and outputs signals indicating the target braking/driving forces Fwxti to the electronic controller 28 for controlling braking force such that the friction braking force by the friction braking device 18 is applied to the wheel having the negative target braking/driving force Fwxti.

Then, the electronic controller 16 for controlling driving force controls the driving current applied to the electric motor generator 40 on the basis of the target driving current It, and controls the front-wheel differential 48 and the rear-wheel differential 52 on the basis of the lateral distribution ratio Ky to the right wheels. The electronic controller 28 for controlling braking force applies the friction braking force according to the target braking/driving force Fwxti to the wheel having the negative target braking/driving force Fwxti. Accordingly, the braking/driving forces Fwxi of the wheels are controlled to coincide with the target braking/driving forces Fwxti.

When the sum of the target braking/driving forces Fwxti is not more than the maximum regenerative braking force by the electric motor generator 40 in case where the vehicle braking/driving force Fv takes a negative value that means it is a braking force, and the target braking/driving forces Fwxti of the wheels take negative values that means they are braking forces, the electronic controller 16 for controlling driving force sets the target driving forces Fwdti and the target friction braking forces Fwbti of the wheels to 0, and sets the target regenerative braking force Frt to the sum of the target braking/driving forces Fwxti, thereby controlling the lateral distribution ratio Ky to the right wheels and the electric motor generator 40 such that the regenerative braking force becomes the target regenerative braking force Frt.

When the magnitude of the target braking/driving force Fwxti of any one of wheels is greater than the maximum regenerative braking force by the electric motor generator 40 in case where the vehicle braking/driving force Fv takes a negative value that means it is a braking force, and the target braking/driving forces Fwxti of the wheels take negative values that means they are braking forces, the electronic controller 16 for controlling driving force sets the target driving forces Fwdti of the wheels to 0, sets the regenerative braking force by the electric motor generator 40 to the maximum regenerative braking force, and sets the lateral distribution ratio Ky to the right wheels such that the distribution ratio of the regenerative braking force to the wheel having the greater target braking/driving force Fwxti increases.

Then, the electronic controller 16 for controlling driving force calculates, as the target friction braking forces Fwbti, the values obtained by the subtraction from the target braking/driving forces Fwxti of the wheels the associated regenerative braking forces of the wheels, and outputs the signals indicating the target friction braking forces Fwbti to the electronic controller 28 for controlling braking force. Further, the electronic controller 16 for controlling driving force controls the electric motor generator 40 such that the regenerative braking force becomes the maximum regenerative braking force, and controls the front-wheel differential 48 and the rear-wheel differential 52 on the basis of the lateral distribution ratio Ky to the right wheels.

In this second embodiment too, the electronic controller 28 for controlling braking force calculates the target braking pressures Pbti (i=fl, fr, rl, rr) of the wheels on the basis of the target friction braking forces Fwbti of the wheels inputted from the electronic controller 16 for controlling driving force, and controls the hydraulic circuit 20 such that the braking pressures Pbi of the wheels becomes the associated target braking pressures Pbti, thereby controlling such that the friction braking forces Fwbi (i=fl, fr, rl, rr) of the wheels become the associated target friction braking forces Fwbti of the wheels.

Figure 8:
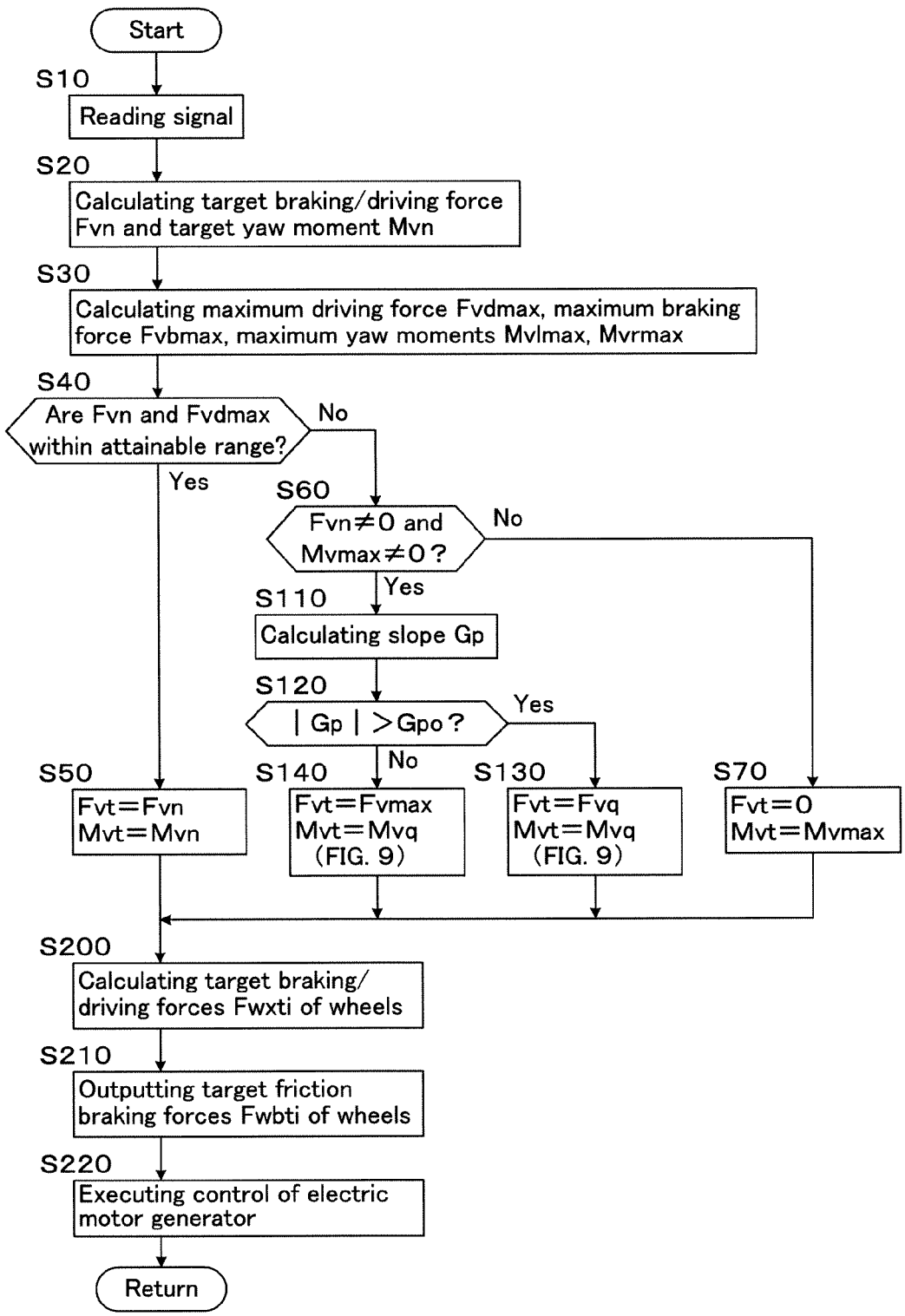
FIG. 8 is a flowchart showing a braking/driving force control routine executed by the electronic controller for controlling driving force in the second embodiment.

The braking/driving force control in the second embodiment will now be explained with reference to the flowchart shown in FIG. 8. Steps in FIG. 8 same as Steps shown in FIG. 3 are identified by the same numbers. The control by the flowchart shown in FIG. 8 is started by the activation of the electronic controller 16 for controlling driving force, and it is repeatedly executed every predetermined time until an ignition switch, not shown, is turned off.

In this second embodiment, Steps 10 to 70 and Steps 200 to 220 are executed in the same manner as in the first embodiment. When the positive determination is made at Step 60, the slope Gp of the segment L linking the point P, which represents the target braking/driving force Fvn and the target yaw moment Mvn, and the origin in FIG. 8, is calculated at Step 110.

At Step 120, it is determined whether or not the absolute value of the slope Gp is greater than a reference slope Gpo, which is defined by the slope of the segment Ld linking the point D and the origin in FIG. 9. When the negative determination is made, the program proceeds to Step 140. When the positive determination is made, the program proceeds to Step 130.

Figure 9B:
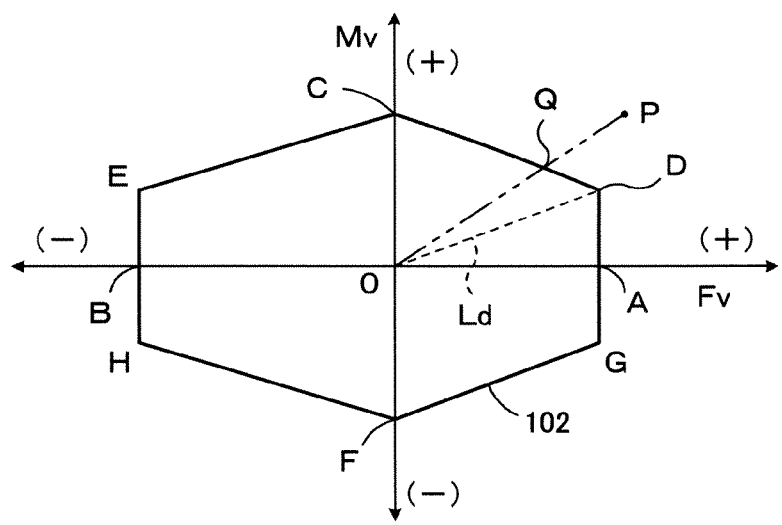
FIG. 9B is an explanatory view showing a manner of a calculation of a vehicle target braking/driving force Fvt and a vehicle target yaw moment Mvt in case where a vehicle target braking/driving force Fvn and a vehicle target yaw moment Mvn are outside the range that can be achieved by the control of the braking/driving force of each wheel.
Figure 9C:
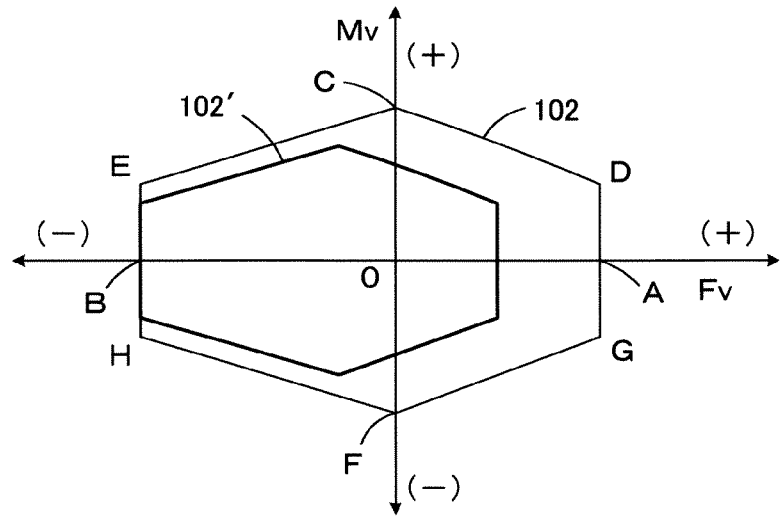
FIG. 9C is an explanatory view showing the range, that can be achieved by the control of the braking/driving force of each wheel, of the target braking/driving force Fvt and the target yaw moment Mvt in the vehicle having a driving source provided only at the right and left front wheels or at the right and left rear wheels.

At Step 130, the point of intersection Q of the segment L, that links the point P representing the vehicle target braking/driving force Fvt and the vehicle target yaw moment Mvt and the origin O, and the outer line of the hexagon 102, is obtained as the target point, as shown in FIG. 9B, and if the coordinate of the target point Q is defined as (Fvq, Mvq), the vehicle target braking/driving force Fvt after the modification and the vehicle target yaw moment Mvt after the modification are set respectively to Fvq and Mvq. Thereafter, the program proceeds to Step 200. In this case, when the target braking/driving force Fvn takes a positive value, the vehicle target braking/driving force Fvt after the modification is a driving force. When the target braking/driving force Fvn takes a negative value, the vehicle target braking/driving force Fvt after the modification is a braking force. When the target yaw moment Mvn takes a positive value, the vehicle target yaw moment Mvt after the modification is set to the yaw moment in the leftward turning direction. When the target yaw moment Mvn takes a negative value, the vehicle target yaw moment Mvt after the modification is set to the yaw moment in the rightward turning direction.

At Step 140, the vehicle target braking/driving force Fvt after the modification is set to the braking/driving force Fvq at the coordinate of the point of intersection Q of the segment L and the outer line of the hexagon 102, and the vehicle target yaw moment Mvt after the modification is set to the yaw moment Mvq at the coordinate of the point of intersection Q. Thereafter, the program proceeds to Step 200. In this case, when the target braking/driving force Fvn takes a positive value, the vehicle target braking/driving force Fvt after the modification is the maximum driving force Fvdmax. When the target braking/driving force Fvn takes a negative value, the vehicle target braking/driving force Fvt after the modification is the maximum braking force Fvbmax. When the target yaw moment Mvn takes a positive value, the vehicle target yaw moment Mvt after the modification is set to the yaw moment in the leftward turning direction. When the target yaw moment Mvn takes a negative value, the vehicle target yaw moment Mvt after the modification is set to the yaw moment in the rightward turning direction.

The control same as that in the above-mentioned first embodiment is executed at Step 210 in this second embodiment, except that the target regenerative braking force Frt and the target friction braking forces Fwbti of the wheels are calculated as described above.

Thus, in the second embodiment, when the target braking/driving force Fvn and the target yaw moment Mvn are not 0 under the condition where the target braking/driving force Fvn and the target yaw moment Mvn cannot be achieved by the control of the braking/driving forces of the wheels, the slope Gp of the segment L linking the point P, which represents the target braking/driving force Fvn and the target yaw moment Mvn, and the origin in FIG. 8, is calculated at Step 110, the point of intersection Q of the segment L and the outer line of the hexagon 102 is obtained as the target point at Steps 120 to 140, and the vehicle target braking/driving force Fvt after the modification and the vehicle target yaw moment Mvt after the modification are set respectively to Fvq and Mvq that are the values at the point Q in accordance with the degree of the slope of the segment L with respect to the reference slope Gpo.

Consequently, according to the illustrated second embodiment, when the vehicle, in which left and right wheels are braked and driven by an electric motor generator common to these wheels, and driving force and regenerative braking force are controlled so as to be distributed to left and right wheels, is under the condition where the target braking/driving force Fvn and the target yaw moment Mvn cannot be achieved by the control of the braking/driving force of each wheel, the vehicle target braking/driving force Fvt after the modification and the vehicle target yaw moment Mvt after the modification are calculated such that, within the range where the ratio of the vehicle target braking/driving force Fvt and the yaw moment Mvt after the modification through the control of the braking/driving force of each wheel coincides with the ratio of the target braking/driving force Fvn and the target yaw moment Mvn through the control of the braking/driving force of each wheel required to the vehicle, the vehicle braking/driving force Fv and the yaw moment Mv take the greatest values in magnitude attainable by the target braking/driving force Fwxti of each wheel. Therefore, like the above-mentioned first embodiment, the braking/driving force of each wheel is controlled such that the ratio of the vehicle braking/driving force and the yaw moment surely coincides with the ratio of the target braking/driving force and the target yaw moment, with the result that the braking/driving force and the yaw moment required to the vehicle can be achieved as much as possible within the range of the braking/driving force that can be generated by each wheel.

According to the illustrated second embodiment, in particular, the electric motor generator 40 that is common to all the wheels and serves as a driving source generates a regenerative braking force, in case where the vehicle target braking/driving force Fvt takes a negative value that means it is a braking force. Therefore, like the above-mentioned first embodiment, the vehicle motion energy can effectively be returned as electric energy upon the braking operation for deceleration, while achieving the braking/driving force and the yaw moment required to the vehicle as much as possible within the range of the braking/driving force that can be generated by each wheel.

According to the illustrated first and second embodiments, the vehicle target longitudinal acceleration Gxt is calculated on the basis of the accelerator opening φ and the master cylinder pressure Pm that indicate the amount of acceleration or deceleration operation by a driver, the vehicle target yaw rate γt is calculated on the basis of the steering angle θ, which is a steering operation amount by a driver, and the vehicle speed V, the target barking/driving force Fvn required to the vehicle is calculated on the basis of the vehicle target longitudinal acceleration Gxt, and the target total yaw moment Mvnt required to the vehicle is calculated on the basis of the vehicle target yaw moment γt.

The vehicle turning yaw moment Ms by the lateral force of each wheel is calculated, and the value obtained by subtracting the turning yaw moment Ms from the vehicle target total yaw moment Mvnt is calculated as the vehicle target yaw moment Mvn, which is required to the vehicle and is to be attained by the control of the braking/driving force of each wheel. Therefore, the vehicle target yaw moment required to the vehicle to be attained by the control of the braking/driving force of each wheel can be surely and correctly calculated in just proportion, compared to the case where the vehicle turning yaw moment Ms attained by the lateral forces of the wheels is not considered.

Although the driving source is the electric motor generator 40 that is common to four wheels in the illustrated second embodiment, the driving source for driving the wheels so as to execute the control of the driving force distribution between left and right wheels may be optional driving means known by a person skilled in the art, such as an internal combustion engine, hybrid system, or the like.

Although a single electric motor generator 40 is provided as a common driving source to four wheels in the illustrated second embodiment, a driving source common to the front-left wheel and front-right wheel and a driving source common to the rear-left wheel and rear-right wheel may be provided. Further, a driving source common to only the front-left wheel and front-right wheel or a driving source common to only the rear-left wheel and rear-right wheel may be provided. In this case, the hexagon 102 takes a shape 102' shown in FIG. 9C. Specifically, when the vehicle yaw moment in the leftward turning direction and the vehicle yaw moment in the rightward turning direction are the maximum values Mvlmax and Mvrmax respectively, the vehicle braking/driving force takes a negative value, which means that the vehicle braking/driving force is a braking force. The above-mentioned effects can also be achieved by this vehicle.

The present invention is explained in detail with respect to specific embodiments, but the invention is not limited to the above-mentioned embodiments. It would be apparent for a person skilled in the art that various other modifications are possible within the scope of the present invention.

For example, although the regenerative braking force is generated according to need by the electric motor generators 12FL to 12RR and the electric motor generator 40 in the aforesaid first and second embodiments, it may be revised such that the regenerative braking is not performed, even if the driving source is an electric motor generator, and the braking force is generated only by the friction braking.

The longitudinal distribution ratio Kr of the braking/driving force to the rear wheels is constant in the aforesaid first and second embodiments. However, the longitudinal distribution ratio Kr to the rear wheels may be variably set in accordance with the magnitude of the steering angle such that the longitudinal distribution ratio Kr to the rear wheels gradually increases as the magnitude of the steering angle increases, since in general, the lateral force of the steerable wheel increases and the allowable longitudinal force of the steerable wheel decreases as the magnitude of the steering angle increases.

In general, as the braking forces of the rear wheels increase upon the braking of the vehicle for deceleration, the lateral force of the rear wheels decreases to thereby deteriorate the running stability of the vehicle. Therefore, the longitudinal distribution ratio Kr to the rear wheels may be variably set in accordance with the vehicle target braking/driving force such that it decreases as the vehicle target braking/driving force takes a negative value and its magnitude is greater.

In the aforesaid first and second embodiments, the target braking/driving force Fvn and the target yaw moment Mvn by the control of the braking/driving force of each wheel required to the vehicle are calculated on the basis of the acceleration/deceleration operation amount and the steering operation amount by the driver. However, in case where the vehicle behavior is unstable, the target braking/driving force Fvn and the target yaw moment Mvn may be corrected so as to be calculated by considering the target longitudinal acceleration or target yaw rate, which are required to stabilize the behavior of the vehicle, in addition to the acceleration/deceleration operation amount and the steering operation amount by the driver.

What is claimed is:

1. A vehicle braking/driving force control apparatus comprising:
   braking/driving force applying means that applies braking/driving forces to wheels;
   means for detecting an amount of driving operation by an occupant;
   means for calculating a vehicle target braking/driving force and a vehicle target yaw moment, based on at least the amount of driving operation by the occupant; and
   control means for controlling the braking/driving force applied to each wheel by said braking/driving force applying means such that, when at least one of said vehicle target braking/driving force and said vehicle target yaw moment is not within an achievable range by the braking/driving forces of the wheels, a vehicle braking/driving force and a vehicle yaw moment are set to maximum values, respectively, within the achievable range, where a ratio of the maximum value of the vehicle braking/driving force and the maximum value of the vehicle yaw moment substantially coincides with a ratio of said vehicle target braking/driving force and said vehicle target yaw moment.

2. A vehicle braking/driving force control apparatus according to claim 1, wherein the means for calculating calculates the maximum values to which the vehicle braking/driving force and the vehicle yaw moment are set, such that, in terms of graphically plotting the maximum values and the achievable range of the vehicle braking/driving force and the vehicle yaw moment in a rectangular coordinate system, a target point in the rectangular coordinate system correlates to the maximum values,
   wherein the rectangular system includes
      an origin,
      a horizontal axis corresponding to a vehicle driving/braking force, and
      a vertical axis corresponding to a vehicle yaw moment,
   wherein a line extending between the vertical axis and the horizontal axis is an outer boundary of the achievable range indicating potential maximum values of the vehicle braking/driving force and the vehicle yaw moment,
   wherein a segment extends between the origin and a calculated point, which coincides with the calculated vehicle target braking/driving force and the vehicle target yaw moment, wherein a point of intersection of the segment and the line is the target point, and wherein said control means controls the braking/driving force applied to each wheel by said braking/driving force applying means such that the vehicle braking/driving force and the vehicle yaw moment are set to the maximum values at said target point.

3. A vehicle braking/driving force control apparatus according to claim 1, wherein said braking/driving force applying means applies the braking/driving force to each wheel independently.

4. A vehicle braking/driving force control apparatus according to claim 1, wherein said braking/driving force applying means applies the braking force to each wheel independently, and applies a driving force from driving means, which is common to right and left wheels, to the right and left wheels in such a manner that a distribution of the driving forces to the right and left wheels is variable.

5. A vehicle braking/driving force control apparatus according to claim 1, wherein said means for calculating calculates said vehicle target braking/driving force and a vehicle target total yaw moment for causing the vehicle to stably run based on at least the amount of the driving operation by the occupant, estimates a vehicle turning yaw moment due to lateral forces of the wheels based on at least the amount of the driving operation by the occupant, and calculates a value obtained by subtracting said vehicle turning yaw moment from said vehicle target total yaw moment as said vehicle target yaw moment.

6. A vehicle braking/driving force control apparatus according to claim 2, wherein the line is determined by a greatest value of a vehicle driving force, a greatest value of a vehicle braking force, a greatest value of a vehicle yaw moment in a leftward turning direction, and a greatest value of a vehicle yaw moment in a rightward turning direction.

7. A vehicle braking/driving force control apparatus according to claim 2, wherein the line is variably set in accordance with a road friction coefficient.

8. A vehicle braking/driving force control apparatus according to claim 2, wherein said means for calculating calculates a vehicle target longitudinal acceleration and a vehicle target yaw rate for stably running the vehicle based on at least the amount of the driving operation by the occupant, and calculates said vehicle target driving/braking force and a vehicle target total yaw moment based on said vehicle target longitudinal acceleration and said vehicle target yaw rate, respectively.

9. A vehicle braking/driving force control apparatus according to claim 2, wherein said control means calculates a target braking/driving force of each wheel based on said vehicle target braking/driving force, said vehicle target yaw moment, and a distribution ratio of the braking/driving force to front and rear wheels, and wherein the control means controls the braking/driving force applied to each wheel based on the target braking/driving force of each wheel.

10. A vehicle braking/driving force control apparatus according to claim 2, wherein said braking/driving force applying means applies the braking/driving force to each wheel independently.

11. A vehicle braking/driving force control apparatus according to claim 2, wherein said braking/driving force applying means applies independently the braking force to each wheel, and applies a driving force from driving means, which is common to right and left wheels, to the right and left wheels in such a manner that the distribution of the driving forces to the right and left wheels is variable.

12. An apparatus comprising:

a braking/driving force applying member that apply braking/driving forces to wheels;

a detection unit that detects an amount of driving operation by an occupant; and an electronic controller configured to calculate a vehicle target braking/driving force and a vehicle target yaw moment, based on at least the amount of driving operation by the occupant, and is configured to control the braking/driving force applied to each wheel by the braking/driving force applying member such that, when at least one of the vehicle target braking/driving force and the vehicle target yaw moment is not within an achievable range by the braking/driving forces of the wheels, a vehicle braking/driving force and a vehicle yaw moment are set to maximum values, respectively, within the achievable range, where a ratio of the maximum value of the vehicle braking/driving force and the maximum value of the vehicle yaw moment substantially coincides with a ratio of the vehicle target braking/driving force and the vehicle target yaw moment.

* * * * *